United States Patent
Chan et al.

(10) Patent No.: US 10,346,824 B2
(45) Date of Patent: Jul. 9, 2019

(54) IMAGE RECOGNITION-BASED PAYMENT REQUESTS

(71) Applicant: The Toronto-Dominion Bank, Toronto, Ontario (CA)

(72) Inventors: Paul Mon-Wah Chan, Markham (CA); John Jong-Suk Lee, Waterloo (CA); Orin DelVecchio, Mississauga (CA)

(73) Assignee: The Toronto-Dominion Bank, Toronto, Ontario (CA)

( * ) Notice: Subject to any disclaimer, the term of this patent is extended or adjusted under 35 U.S.C. 154(b) by 923 days.

(21) Appl. No.: 14/927,202

(22) Filed: Oct. 29, 2015

(65) Prior Publication Data

US 2017/0124540 A1    May 4, 2017

(51) Int. Cl.
```
G06Q 40/00      (2012.01)
G06Q 20/32      (2012.01)
G06K 9/00       (2006.01)
G06Q 20/40      (2012.01)
```
(Continued)

(52) U.S. Cl.
CPC ......... *G06Q 20/32* (2013.01); *G06K 9/00288* (2013.01); *G06Q 20/102* (2013.01); *G06Q 20/204* (2013.01); *G06Q 20/3224* (2013.01); *G06Q 20/4014* (2013.01); *G06Q 20/40145* (2013.01)

(58) Field of Classification Search
CPC .... G06Q 20/32; G06Q 20/102; G06Q 20/204; G06Q 20/3224; G06Q 20/4014; G06Q 20/40145; G06K 9/00288
See application file for complete search history.

(56) References Cited

U.S. PATENT DOCUMENTS

| | | |
|---|---|---|
| 7,117,370 B2 | 10/2006 | Khan et al. |
| 7,258,268 B2 | 8/2007 | Steiger, Jr. |
| 7,636,679 B2 | 12/2009 | Song et al. |

(Continued)

OTHER PUBLICATIONS

M-payments: hang up, try again: once feared by banks as a telecom Trojan horse, mobile payments appear to be immobilized, at least temporarily. What will be needed to revive them? (E-Payments), Begonha, Duarte Bacelar; Hoffmann, Alexandre; Melin, Paul. Credit Card Management15.10: 40(3). SourceM (Year: 2002).*

(Continued)

*Primary Examiner* — Lalita M Hamilton
(74) *Attorney, Agent, or Firm* — Fish & Richardson P.C.

(57) ABSTRACT

The present disclosure involves systems, software, and computer implemented methods for sending payment requests to one or more persons or entities based on images in which the persons or entities appear. In one example, operations may include identifying a first image associated with a payment request, the identified first image including one or more identifiers of persons, as well as identifying a second image associated with a bill, the bill including one or more line items, each line item associated with a cost. In response to a request to initiate a bill payment split, the bill is presented where at least a portion of the line items are selectable. A selection of at least one line item is received, and a selection of a particular person from the one or more identifiers of persons to be associated with the at least one line items is received. The at least one selected line item is assigned to the selected particular person.

19 Claims, 15 Drawing Sheets

(51) Int. Cl.
 *G06Q 20/10* (2012.01)
 *G06Q 20/20* (2012.01)

(56) References Cited

U.S. PATENT DOCUMENTS

| | | |
|---|---|---|
| 7,933,835 B2 | 4/2011 | Keane et al. |
| 8,073,770 B2 | 12/2011 | Cole et al. |
| 8,238,638 B2 | 8/2012 | Mueller et al. |
| 8,421,594 B2 | 4/2013 | Anders |
| 8,433,127 B1 | 4/2013 | Harpel et al. |
| 8,719,129 B2 | 5/2014 | Mehta et al. |
| 9,978,052 B2 * | 5/2018 | Zhao .................... G06Q 20/227 |
| 2006/0044599 A1 * | 3/2006 | Lipowitz ................ G06Q 30/06 358/1.15 |
| 2007/0244778 A1 | 10/2007 | Bailard |
| 2009/0234764 A1 | 9/2009 | Friesen |
| 2011/0087611 A1 | 4/2011 | Chetal |
| 2011/0255736 A1 | 10/2011 | Thompson et al. |
| 2012/0158582 A1 | 6/2012 | Nuzzi |
| 2012/0158589 A1 | 6/2012 | Katzin et al. |
| 2012/0185398 A1 | 7/2012 | Weis et al. |
| 2012/0267432 A1 | 10/2012 | Kuttuva |
| 2012/0284115 A1 | 11/2012 | Reardon et al. |
| 2013/0018794 A1 | 1/2013 | Ungerland, II et al. |
| 2013/0218652 A1 * | 8/2013 | Fargo .................... G06Q 30/02 705/14.16 |
| 2013/0218757 A1 | 8/2013 | Ramanathan |
| 2014/0052621 A1 | 2/2014 | Love |
| 2014/0089195 A1 | 3/2014 | Ward et al. |
| 2014/0101049 A1 | 4/2014 | Fernandes et al. |
| 2014/0108247 A1 | 4/2014 | Artman et al. |
| 2014/0156512 A1 | 6/2014 | Rahman et al. |
| 2014/0156517 A1 * | 6/2014 | Argue .................. G07G 1/0081 705/40 |
| 2014/0164152 A1 * | 6/2014 | Inukai ..................... G06G 1/14 705/15 |
| 2014/0214652 A1 | 7/2014 | Zheng |
| 2014/0328521 A1 * | 11/2014 | Colangelo ............... H04L 67/18 382/118 |
| 2014/0330654 A1 * | 11/2014 | Turney .................. G06Q 20/14 705/15 |
| 2015/0348045 A1 | 12/2015 | Agarwal |

OTHER PUBLICATIONS

Asokan et al., "The State of the Art in Electronic Payment Systems", vol. 30, Issue 9, published in 1997, pp. 28-35.

Merritt, "Mobile Money Transfer Services—The Next Phase in the Evolution of Person-to-Person Payments", Aug. 2010, 32 pages.

* cited by examiner

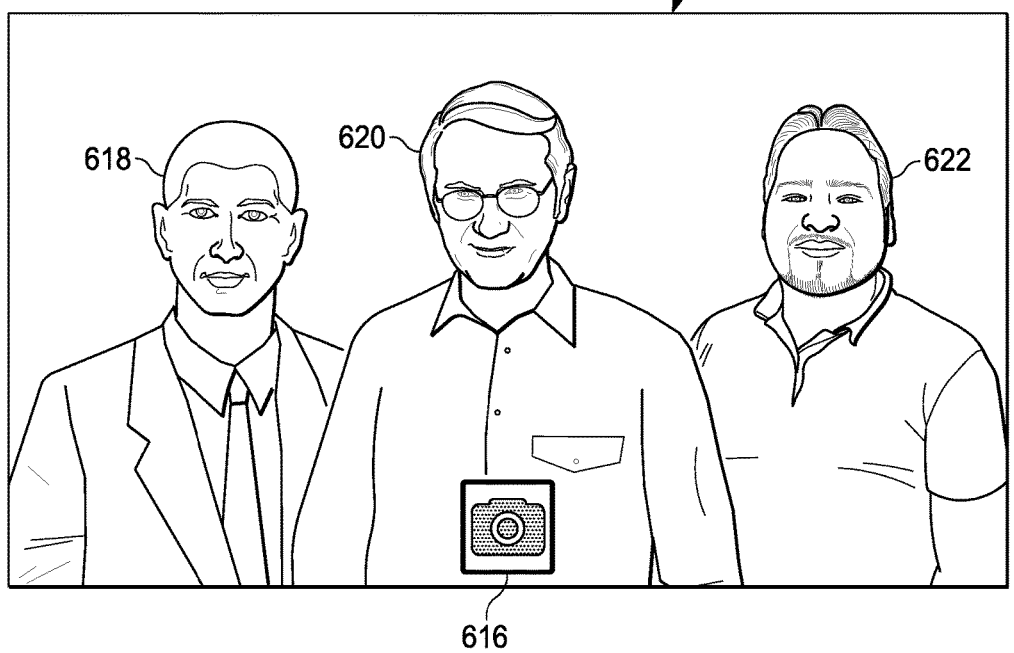

FIG. 6I

IMAGE RECOGNITION-BASED PAYMENT REQUESTS

CROSS-REFERENCE TO RELATED APPLICATIONS

This application is related to U.S. application Ser. No. 14/529,508, filed on Oct. 31, 2014, the contents of which are hereby incorporated by reference.

TECHNICAL FIELD

The present disclosure relates to computer systems and computer-implemented methods for sending payment requests to one or more persons or entities based on images (e.g., photos) in which the persons or entities appear.

The concept of mobile payments, including mobile wallets, refers to a type of commerce where, in lieu of cash, checks, or credit cards, consumers can use a mobile device to pay for a wide range of services and digital or hard goods. Only recently has device and payment technology advanced enough to support a widely available system for payment. The demand for mobile payments, both in developed and developing countries, provides merchants and payment processors with significant opportunities to open markets to mobile users.

For example, PayPal, Apple, Google, Visa, MasterCard, and other financial processing providers have assisted the growth of mobile payments at traditional points of sale. Through Near Field Communication (NFC), Radio-Frequency Identification (RFID), and barcode-based solutions, more and more consumers use their mobile devices to pay for goods and services where they previously used credit cards or other means of payment.

Mobile devices, including phones and tablets, have been able to improve the payment process for varying transactions over the last few years, including by allowing users to directly use their phones to initiate and respond to payment requests. In many cases, however, the person or entity to whom payment is being requested from or sent to must be a known entity, in that they must be either a current contact of the initiating user or payment instructions must be provided (e.g., via NFC, RFID, or Wi-Fi-based communications, via direct entry of payment instructions, or others). For example, some prior systems allow users to "tap" their devices together in order to initiate a funds transfer. In others, the device can be moved nearby a payment terminal at a certain time to exchange payment details via NFC. In still others, a barcode presented on the device may be scanned by a payment terminal to process the payment.

SUMMARY

The present disclosure involves systems, software, and computer-implemented methods for sending payment requests to one or more persons or entities based on images in which the persons or entities appear. In one example method, operations may include identifying a first image associated with a payment request, the identified first image including one or more identifiers of persons, as well as identifying a second image associated with a bill, the bill including one or more line items, each line item associated with a cost. In response to a request to initiate a bill payment split, the bill is presented where at least a portion of the line items are selectable. A selection of at least one line item is received, and a selection of a particular person from the one or more identifiers of persons to be associated with the at least one line items is received. The at least one selected line item is assigned to the selected particular person. In some implementations, the operations may further include transmitting a payment request to the selected particular person for the at least one assigned line item.

In some instances, the selection of the particular person is received after receiving the selection of the at least one line item. In other instances, the operations may further include analyzing the identified first image to identify at least one person from the one or more identifiers of persons as a potential recipient of the payment request. In some instances, the one or more identifiers of persons included in the first image may comprise images of one or more persons associated with the one or more identifiers of persons, and wherein analyzing the identified first image to identify at least one person includes performing a facial recognition process on the images of the one or more persons to identify the at least one person. In some instances, two or more persons are identified as potential recipients of the payment request.

In some implementations, the operations may further include, in response to the request to initiate the bill payment split, performing an optical character recognition process on the bill, wherein the optical character recognition process identifies individual line items from the one or more line items and associates the individual line items with the corresponding cost associated with the individual line item. In some instance, an overlay of the bill may be generated based on the optical character recognition process, wherein the overlay comprises selectable user interface objects associated with and presented as an overlay of the individual line items from the one or more line items. In those instances, receiving the selection of the at least one line item may comprise receiving a selection of user interface objects associated with and presented as overlays of the at least one selected item. In some instances, assigning the at least one selected line item to the selected particular person includes associating the costs associated with each of the at least one selected line item to the selected particular person.

In some instances, further in response to the request to initiate the bill payment split, an interactive presentation of one or more persons included in the one or more identifiers of persons included in the first image can be presented adjacent to the bill. In further instances, receiving the selection of the at least one line item from the bill may include receiving a touch-based input selection associated with the at least one line item. Still further, receiving the selection of the particular person may include receiving, subsequent to the touch-based input selection of the at least one line item, a drag touch-based input from the at least one selected line item to the particular person from the one or more persons. In some instances, at least one of gratuities and taxes may be automatically assigned based on a proportion of the at least one selected line items associated with the selection. In some instances, the at least one selected line item from the bill is a first set of at least one line items, and the selection of the particular person from the one or more identifiers of persons is a selection of a first particular person. In such instances, the method may further include receiving a selection of a second set of at least one line item, the second set of at least one line item mutually exclusive from the first set of at least one line items, receiving a selection of a second particular person from the one or more identifiers of persons to be associated with the at least one line items, and assigning the second set of the at least one selected line items to the selected second particular person.

In some instances, the first particular person and the second particular person are the same While generally described as computer-implemented software embodied on tangible media that processes and transforms the respective data, some or all of the aspects may be computer-implemented methods, instructions stored on non-transitory computer media, or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 6A-I are example screenshots providing an illustration of one implementation of a bill splitting mechanism and user interface.

DETAILED DESCRIPTION

Figure 1:
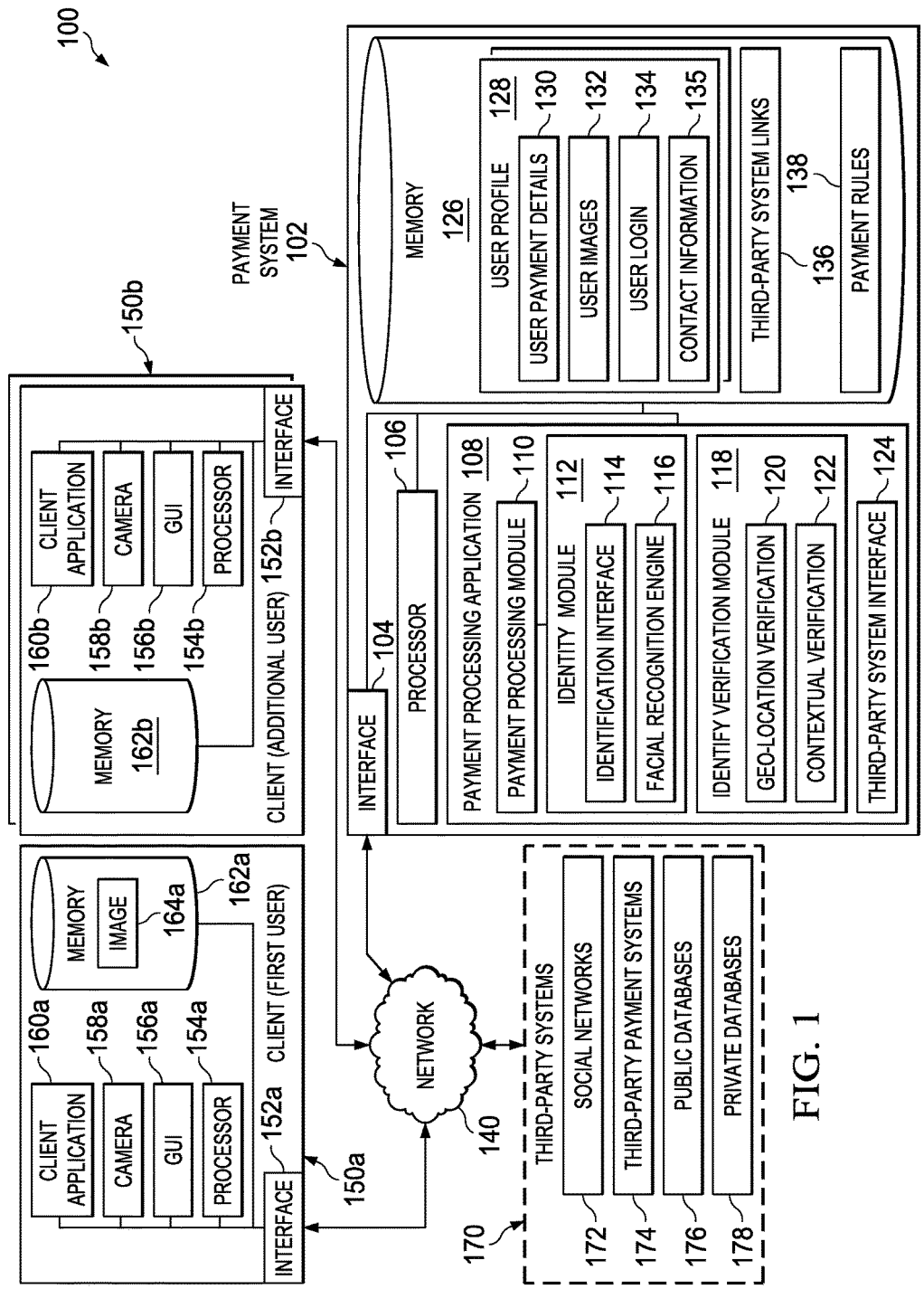
FIG. 1 is a block diagram illustrating an example system for sending payment requests to one or more persons or entities based on images in which the persons or entities appear.

The present disclosure describes a system that can receive an image associated with a payment request. The system processes the image, e.g., using facial and image recognition, to identify one or more persons or entities included in the received image. The system can then identify contact information associated with the identified persons or entities and send requests to either receive or submit payments in response to the payment request.

From a user's perspective, the user can request payment from other persons or initiate a payment to be sent to others using images alone to initiate such payment requests. The initiating user may capture the person to whom the payment request is to be sent in an image using a camera integrated into their mobile device or can identify a pre-existing image. Using that image, along with details of the monetary value to be sent or requested to be received, the initiating user can request payment. Instead of providing details on the recipients included in the image, the system can use advanced image analysis to identify the persons included in the image and direct payment accordingly.

In general, the present disclosure describes a system capable of providing a simpler and easier solution to users initiating a payment request, by providing such functionality without requiring a prior relationship to the recipients of the request (i.e., the system works for strangers as well as known associates), without requiring an exchange of money between present devices, and allows for delayed payments or repayments (i.e., after initial payment by a single person paying for multiple people). Further, verification techniques used during the facial recognition process can reduce errors in the process to help avoid false claims and requests for repayment. In some instances, scanned facial and other biometric information may be provided to and/or obtained by a financial or health institution as an authentication mechanism. That information can later be used to verify the identity and/or accounts of persons included in an image before facilitating transfers of funds.

Several helpful use cases explain the additional benefits of such a system. In a first case, a transfer of monetary funds (or other suitable value) can be performed between two or more people. For example, in a person-to-person transaction, Person A may wish to pay Person B using an implementation of the described system. Person B may not have a mobile phone, while Person A may not have cash or a check. Person A can take a picture of Person B using Person A's mobile device and, using a suitable mobile application on Person A's mobile device, indicate that a particular amount should be sent to Person B. Instead of Person B requiring a mobile device, or generally accepting mobile charges, the implemented system receives the photo/image and, using facial recognition techniques, identifies contact information associated with Person B. The system can send Person B a notification of a request to send funds to Person B. In some instances, Person B can accept the transfer prior to the value being sent. In response to identifying Person B and confirming the contact information, the system can use traditional or specifically implemented payment processing techniques to process the payment from Person A to Person B.

In a second case, a group of friends or acquaintances may attend a dinner or event, such as a friend's birthday. Instead of splitting the bill multiple ways at the time, the participants may elect to have fewer than all participants pay there, while later collecting money from the remaining group to cover each's fair share. During the festivities, a waitress, third party, or participant may take a picture of one or more of the group. Using the photo of the group, and identifying a portion of the bill to be split, an implementation of the system can identify the persons in the photo using facial recognition, connect those participants to their contact and account information, and request payment as needed. One or more of the participants, such as the person whose birthday that is being celebrated, or those who were able to pay at the time, may be excluded as directed by the requesting user. In some instances, specific faces may be selected at the initial phase to keep certain persons from being included in the payment request. Various verification techniques can be used to ensure that the persons identified in the photo. In some cases, the photo recognition may be based on one or more systems, services, or repositories outside of the payment processor or entity providing the solution. For example, photo recognition may be used via one or more social networks, search engines, public or private databases, as well as others. In some instances, the photo recognition may be based on a dedicated facial recognition database provided by the payment processor. In some instances, additional sources may be used based on incomplete or unavailable results from a primary data source.

In a third use case, a tool for splitting a particular bill and its various line items between a group of persons may be made available. The tool may include an interactive user interface (UI) that allows individual line items in a bill to be selected and assigned and/or associated with particular persons, e.g., via drag-and-drop mouse-based and/or touch-based commands, among others. After the selections and assignments are complete, the bill amounts may be requested from the persons to allow for an easy splitting of the bill's payment. In some instances, a first person may pay the entirety of the bill and request repayment using the described tool/UI.

In a fourth use case, the described tools may allow for proxy images and/or persons to be used in lieu of photos and/or images related directly to the bill and payment being requested. In the proxy instance, one or more persons (or entities) may be predefined as associated with a particular payment-related individual or entity. When a photo or image is used and a person associated with the proxy is included, the tool can identify the person, connect them to the particular payment-related individual or entity with which they are associated, and cause the payment request to be routed to the appropriate person or entity based on that association. In these instances, the persons or users submitting the payment request may not need to know the particular contact information of the third party associated with the proxy in the image, only that the persons in the image are associated with the third party with the system managing and routing the payment request appropriately. In other instances, proxy images may include persons, objects, or things that are not the payment-related individual or entity. In those instances, the association between the proxy image and the payment-related individual or entity may be defined by a person requesting payment (either before or during the request for payment), by the payment-related individual, or based on usage or connection of the proxy image to the payment-related individual or entity in other settings, including social networks.

Turning to the illustrated embodiment, FIG. 1 is a block diagram illustrating an example system 100 for sending payment requests to one or more persons or entities based on photos or images in which the persons or entities appear. As illustrated in FIG. 1, system 100 is a client-server system capable of sharing images across network boundaries for the purposes of making or requesting payments, analyzing those images to identify one or more persons included within the photos, and communicating with those identified persons to coordinate payments between the initiating user and the one or more persons. Specifically, system 100 includes or is communicably coupled with a payment system 102, a first client 150a and one or more additional clients 150b, a network 140, and one or more third-party systems 170. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, payment system 102 may be any computer or processing device such as, for example, a blade server, general-purpose personal computer (PC), Mac®, workstation, UNIX-based workstation, or any other suitable device. Moreover, although FIG. 1 illustrates a payment system 102, payment system 102 can be implemented using two or more systems, as well as computers other than servers, including a server pool. In other words, the present disclosure contemplates computers other than general purpose computers, as well as computers without conventional operating systems. Further, illustrated payment system 102, clients 150a/b, and the third-party systems 170 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the payment system 102 is used to receive and process payment requests. The payment system 102 illustrated herein is described in terms of the operations related to photo-based payment requests. However, the payment system 102 may, in some implementations, be a larger system providing payment operations related to credit cards, banking, and other types of payments in addition to photo-based payment requests. In other implementations, the payment system 102 may be separate from traditional payment systems, and may use processing power and functionality associated with those traditional systems to perform the actual payment processing, wherein the photo recognition and payment requests sent are managed by the illustrated payment system 102.

The illustrated payment system 102 can receive payment requests from one or more clients 150, where payments requests, whether requesting payment from or to another, include one or more photos each including one or more persons or entities associated with the payment request, as well as an amount or value to be associated with the requested payment. The payment system 102 has, or is associated with, functionality for determining the identity of the persons or entities included in the one or more photos, identifying account and/or contact information associated with the identified persons or entities, and delivering the payment request to those identified persons or entities based on the account or contact information. In some instances, the payment system 102 may automatically debit or credit an account associated with the identified person or entity without the need for acceptance or confirmation from the recipient, or additionally or alternatively, the requesting person.

The payment system 102 may, in some implementations, manage the operations to be performed while leveraging available technologies, web services, existing knowledge bases, and other outside capabilities to perform some or all of the operations. For example, external photo recognition databases may be accessed, such as those associated with social networks, e.g., Facebook, LinkedIn, etc. Additionally, information from third-party systems may be useful in verifying particular photo determinations, such as location data from a user's mobile device that can be used to verify the location of the recipient matches or coincides with the location of the photo. Alternatively, information from social networks, such as check-ins and other location- and timing-related information, can be used to verify the determinations of the facial recognition system.

As illustrated, the payment system 102 includes an interface 104, a processor 106, a payment processing application 108, and memory 126. In general, the payment system 102 is a simplified representation of one or more systems and/or servers that provide the described functionality, and is not meant to be limiting, but rather an example of the systems possible.

The interface 104 is used by the payment system 102 for communicating with other systems in a distributed environment—including within the environment 100—connected to the network 140, e.g., clients 150, one of the third-party systems 170, and other systems communicably coupled to the network 140. Generally, the interface 104 comprises logic encoded in software and/or hardware in a suitable combination and operable to communicate with the network 140. More specifically, the interface 104 may comprise software supporting one or more communication protocols associated with communications such that the network 140 or interface's hardware is operable to communicate physical signals within and outside of the illustrated environment 100.

As illustrated in FIG. 1, the payment system 102 includes a processor 106. Although illustrated as a single processor 106 in FIG. 1, two or more processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the payment system 102. Specifically, the processor 106 executes the algorithms and operations described in the illustrated figures, including the operations performing the functionality associated with the payment system 102 generally, as well as the various software modules (e.g., the payment processing application 108), including the functionality for sending communications to and receiving transmissions from clients 150 and third-party systems 170.

The illustrated payment system 102 also includes memory 126, or multiple memories 126. The memory 126 may include any memory or database module and may take the form of volatile or non-volatile memory including, without limitation, magnetic media, optical media, random access memory (RAM), read-only memory (ROM), removable media, or any other suitable local or remote memory component. The memory 126 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the life insurance platform 102. Additionally, the memory 126 may store any other appropriate data, such as VPN applications, firmware logs and policies, firewall policies, a security or access log, print or other reporting files, as well as others. For example, memory 126 can store user profile information 128 associated with one or more users of the photo payment system. The user profile information 128 can be used to associate pictures and identified persons with one or more accounts and contact information.

As illustrated, the user profile information 128 may include information on a plurality of users and can include user payment details 130, user images/photos 132, user login information 134, and user contact information 135. The user payment details 130 may provide information related to one or more bank accounts, credit card accounts, or other payment information, including online payment accounts. The user payment details 130 can allow the system and the payment processing application 108 to access and update accounts with transactions performed using the system 100. For example, in response to a first user submitting a payment request to pay a second user, the user payment details 130 from the first user's profile can be used to fund the transaction. Similarly, the user payment details 130 from the second user's profile can be used to receive the transaction. In some instances, the user payment details 130 may be associated with an online account. In those instances, the user login information 134 may be used to access that account if such access is needed. The user login information 134 may also be used to access one or more accounts related to a particular user, such as a social network, mobile carrier, photo site, or others. In instances where the user is not associated with any login information or payment details, the system 102 may contact the user to register a new account, where necessary.

The user images 132 may be a collection of images (e.g., photos) associated with a particular user. The user images 132 may include images in which the particular user is present, as well as images submitted by the particular user for use in a prior payment request. New images associated with the user can be added to the repository for later use. In some instances, the analysis of particular images may require the determination of a person's identity using external facial recognition services. In those instances, images from the external source may be imported into the user images 132 repository, if allowed by the user. This may enhance and increase the speed of the payment system. The images used in the present disclosure may be in or more file formats, including but not limited to JPEGs (Joint Photographic Experts Group), GIFs (Graphic Interchange Format), TIFFs (Tagged Image File Format), RAW (raw image formats), and PNG (Portable Network Graphics). In some instances, metadata associated with the images can be included within the file (e.g., via headers) or associated with the file.

The contact information 135 of a user can be used to determine how to contact the user when a new payment request associated with the user is received. In some instances, the contact information 135 may be similar to the user payment details 130, or may be determined based on the user payment details 130. The contact information 135 may be retrieved or identified based on the location from where the image recognition was made. For example, LinkedIn, Facebook, or other online profiles may be searched as one of the external sources. In those instances, contact information from those profiles and accounts may be used to contact the particular match and can be imported into the payment system 102, as appropriate.

Some or all of the information associated with the user profile 128 can be provided by the user corresponding to the user profile 128. The user can initially set up the user profile 128 to include the relevant information, such as when a first payment request is received, or upon sending the first payment request.

In addition to the user profile 128, memory 126 includes a set of third-party system links 136 and payment rules 138. The third-party system links 136 can include links and information associated with the one or more third-party systems 170 used to assist in the image recognition-based payment process. This information can include details on one or more application programming interfaces (APIs) associated with the third-party systems 170, login information to particular databases and/or repositories, and procedural information and instructions for using those systems. Payment rules 138 include a set of rules and algorithms defining how the payment processing application 108 performs, including rules related to particular orders in which the internal and external modules and systems are used or employed during the image recognition-based payment process. In some instances, at least a portion of these rules may be configurable, such that an authorized individual can modify the performance of the payment system 102.

As noted, the payment system 102 includes the payment processing application 108. The payment processing application 108 represents an application, set of applications, software, software modules, or combination of software and hardware used to manage the image recognition-based payment request process of the payment system 102. In the present solution, the payment processing application 108 can perform operations including receiving images from clients 150 associated with a payment request, analyze the photo to identify at least one person or entity included in the image, verify the person based on additional information to ensure the correct recipient of the payment request, and interface with one or more external sources when additional information is necessary. Further, upon identifying and determining information associated with persons or entities within the image, the payment processing application 108 can cause the payment request to be processed and completed, as needed. The payment processing application 108 can include and provide various functionality to assist in the management and execution of the image recognition-based payment process. As illustrated in FIG. 1, the payment processing application 108 includes a payment processing module 110, an identity module 112, an identity verification module 118, and a third-party system interface 124. Additional modules and functionality may be included in alternative implementations.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The payment processing module 110 performs operations associated with processing payments after identities are verified and payment requests are received and acknowledged. The payment processing module 110 can use the user payment details 130 of each user in a particular transaction to debit and credit accounts, as needed. The payment processing module 110 may be part of a pre-existing payment processing system, such as those managed by Visa, MasterCard, PayPal, or any other transactional provider. Alternatively, the payment processing module 110 may be associated with one or more financial institutions and can provide operations for the transactions. The operations performed in actually performing the payment processing may be similar to those in traditional payment processing, or they may be specifically designed for the image recognition-based payment process. Still further, the solution could be implemented and used with person-to-person (P2P) transfers and wires as part of the payment processing operations.

The identity module 112 performs operations for identifying persons included in the one or more images associated with a payment request. The identity module 112 can determine, using the received image, a number of persons for whom to perform an identification on from the image. In some instances, the submission of the image from the client 150 may include an indication of one or more persons or entities within the image to be omitted from the facial recognition (e.g., persons not associated with the payment request). For the remaining persons, concurrent, simultaneous, or serialized facial recognitions can be performed. As illustrated, the identity module 112 includes a facial recognition engine 116. The facial recognition engine 116 can perform facial recognition on the one or more persons associated with the payment request. The facial recognition engine 116 can perform any suitable type of facial recognition (e.g., traditional, 3-dimensional, or skin texture analysis, among others), using one or more databases, for example, the user images 132. Additionally, the identity module 112 includes an identification interface 114 for interacting with one or more external facial recognition systems, one or more facial or image databases, and one or more other external sources as appropriate. Using the identification interface 114, as well as the third-party system interface 124, one or more external services and knowledge bases can be used to perform or assist in the facial recognition. Such external systems and sources may be publicly or privately available in different implementations. After operating, the identity module 112 can return one or more potential matches from the one or more images. The operations may be able to handle and interpret both compressed and uncompressed images. In situations where an error arises or the image cannot be processed and person(s) identified (e.g., based on image size, image quality, image orientation, person making a manipulated or distorted face), then the system can prompt the user to re-take the photo, provide additional information, or provide alternative methods to identify the person(s) in the image (e.g., email address, relevant information, etc.)

The identity verification module 118 performs verification operations to reduce misidentifications of persons or entities by the identity module 112. In some instances, the identity verification module 118 may be optional and may include various alternative methods of verifying or reducing misidentifications. The illustrated identity verification module 118 includes a geo-location verification module 120 and a contextual verification module 122. The geo-location verification module 120 can be used to verify that the persons identified by the identity module 112 were physically located in a position at the time the one or more images were taken. Each digital image may include or be associated with a set of metadata providing information identifying the owner of the image, copyright and contact information, the camera or device that created the file, exposure information, and other descriptive information related to the digital image. Included in the descriptive information may be geo-location data from where the image was taken or created, such as a longitude and latitude received from a global positioning satellite. In some instances, the geo-location verification module 120 may use such location metadata from the digital file to verify that the one or more persons identified by the identity module 112 were located at or near the location at which the image was taken. Such verifications can be performed by accessing location information on a device associated with the recipient and confirming that the recipient was near the location. Alternatively, information may be retrieved or confirmed by a mobile carrier providing service to the recipient's device (with permission from the user), location information reported back by one or more apps associated with the recipient's mobile device, or by other suitable information. If the geo-location verification module 120 confirms the person was in a similar location to that of where the digital image was taken as determined by the digital image's metadata, the payment request may be verified.

In some instances, the identity module 112 may further include functionality and perform operations for connecting one or more identified persons acting as proxy persons to one or more other persons or entities. For example, some individuals or entities in an image may be used as a proxy for a third party or entity. One example would be a teacher at a school being associated with the school itself, such that when the teacher is identified in a photo or image, it is not the teacher who becomes associated with the payment request, but the school at which the teacher works or is associated. Other similar connections can be made and stored in corresponding user profiles 128, as appropriate.

The contextual verification module 122 may perform other verifications of the payment request. The contextual verification module 122 may also use the metadata associated with the digital image file. Instead of comparing the geo-location of the recipient, the contextual verification module 122 may use contextual information to compare with the digital file's location of origin. For example, the contextual verification module 122 may be capable of accessing one or more social networks. Using check-ins, statuses, and other information provided by the recipient, the contextual verification module 122 can determine whether the recipient was located near the location of origin at the time of the image. If the payment processor and the identity verification module 118 are closely aligned, the location in the digital file may be compared to one or more recent purchases at establishments near the time of image to confirm the verification. Additional contextual verifications may be based on relative friendships, relationships, and social circles of the persons involved in the transaction. A relative relationship, even if not direct, between the persons may indicate a higher probability of verification. In some instances, a threshold level of relationship (i.e., a second-degree relationship, where friends are held in common) may be required for verification. If the identified person has no relation to the person initiating the payment request, the verification may indicate that the identification is less likely, and other verifications may be needed. In some implementations, time-based verifications may be placed on received images. For example, some systems may implement a time verification identifying an age of an image (from creation of the file, the date the image was created, etc.) and determining whether the image is older than a threshold time limit. This may be used to prevent potentially fraudulent requests, untimely requests, and requests that may not be correct. For example, a time limit of three (3) days may be imposed. If an image file is determined to be four (4) days old, the system may reject or end the payment request. Different time limits may be imposed, such as a week, 24 hours, or any other suitable time. Such restrictions and verifications can be used together or separately, as implemented.

Once the identity of the persons or entities in the image is verified, the information can be provided back to the payment processing module 110 to continue and facilitate the payment request.

The third-party system interface 124 provides functionality and connectivity for the payment processing application 108 to access the one or more third-party systems 170. The third-party system interface 124 can provide defined or dynamic connections to the external systems via network 140, using those connections to provide additional information and processing power to the payment system 102 to perform its prescribed operations.

Network 140 facilitates wireless or wireline communications between the components of the environment 100 (i.e., between the payment system 102 and clients 150 and/or the third-party systems 170, between clients 150, and among others), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The third-party systems 170 can include any suitable external systems, functionality, or operations that assist the payment processing application 108 in the image recognition-based payment process. As illustrated, the third-party systems 170 include one or more social networks 172, third-party payment systems 174, public databases 176, and private databases 178. The one or more social networks 172 can be used for facial recognition and image identification as well as via location and contextual verification. The third-party payment systems 174 can be any existing systems used by the payment processing application 108 and its payment processing module 110 to effectuate processing of the payment. The public and private databases 176, 178 may include image and facial recognition databases used by public and private entities. For example, the public databases 176 may include governmental databases or other openly available sources of facial recognition-related data. The private databases 178 may be those managed by private sources, such that membership or access is provided to the payment system 102 in exchange for payment or other consideration. In some instances, external facial recognition engines may be used.

Clients 150 (150a and 150b) may be any computing devices operable to connect to or communicate with payment system 102, other clients 150, or other components via network 140, as well as the with the network 140 itself, using a wireline or wireless connection, and can include a desktop computer, a mobile device, a tablet, a server, or any other suitable computer device. In general, client 150 comprises an electronic computer device operable to receive, transmit, process, and store any appropriate data associated with the environment 100 of FIG. 1.

As illustrated, clients 150 include an interface 152, a processor 154, a graphical user interface (GUI) 156, a camera 158, a client application 160, and memory 162. The interface 152 and processor 154 may be similar to or different than the interface 104 and processor 106 described for payment system 102. In general, processor 154 executes instructions and manipulates data to perform the operations of the client 150. Specifically, the processor 150 executes the algorithms and operations described in the illustrated figures, including the operations performing the functionality associated with the client application 160 and camera 158.

Client 150 executes a client application 160 operable to prepare and submit payment requests, where the payment request includes submitting one or more images 164 to the payment system 102. The images 164 may be taken by an integrated camera 158 on the client 150, or the image may be taken from another camera apart from the client 150 or downloaded or obtained from an external location. Client application 160 may be a web site, portal page, a dedicated mobile application, or other software. The client application 160 may include integrated camera software for taking images with camera 158 and/or importing images.

Client 150 can also include a graphical user interface (GUI) 156. The GUI 156 interfaces with at least a portion of the environment 100 for any suitable purpose, including generating a visual representation of a web browser and/or the client application 160. In particular, the GUI 156 may be used to view and navigate various web pages located both internally and externally to environment 100, as well as to view and navigate through information accessed by the client application 160, such as information stored at or associated with the payment system 102. Generally, the GUI 156 provides the particular user with an efficient and user-friendly presentation of data provided by or communicated within the system. The GUI 156 may comprise a plurality of customizable frames or views having interactive fields, pull-down lists, and buttons operated by the user. For example, the GUI 156 may provide interactive elements that allow a user to view or interact with images to identify images for requesting payment and for sending said requested payment to the payment system 102. The GUI 156 may present information associated with the client application 160 for viewing and interaction. In general, the GUI 156 is often configurable, supports a combination of tables and graphs (bar, line, pie, status dials, etc.), and is able to build payment requests. Therefore, the GUI 156 contemplates any suitable graphical user interface, such as a combination of a generic web browser, intelligent engine, and command line interface (CLI) that processes information in the platform and efficiently presents the results to the user visually.

The illustrated client 150 is intended to encompass any computing device such as a desktop computer, laptop/notebook computer, mobile device, smartphone, personal data assistant (PDA), tablet computing device, one or more processors within these devices, or any other suitable processing device. For example, the client 150 may comprise a computer that includes an input device, such as a keypad, touch screen, or other device that can accept user information, and an output device that conveys information associated with the operation of the client application 160 or the client 150 itself, including digital data, visual information, or a GUI 156, as shown with respect to the client 150.

Client 150 also includes memory 162, which may be similar or different to memory 126. Memory 162 includes at least one image, either as captured by camera 158 or that is imported or otherwise stored on the client 150.

As illustrated, client 150*a* may be associated with a first user initiating the payment request, where image 164*a* is submitted, using client application 160*a*, to the payment system 102. In this example, the client application 160*a* may be a dedicated mobile application associated with the payment system 102 and meant to provide image—based payment requests. Client 150*b* may be associated with one or more additional users who are receiving the payment request (i.e., recipients) after the payment system 102 performs the facial recognition and association with the corresponding users. The additional clients 150*b* may, e.g., via client application 160*b*, receive a notification of the payment request. If payment is requested from the client 150*b*, the client application 160*b* may allow the corresponding users to accept and pay the requested amount. If payment is to be sent to the users associated with clients 150*b*, then a notification message may be received. In some instances, no action may need to be taken to perform the transaction when payment is being sent to the client 150*b*.

In some implementations, the client application(s) 160 may provide a bill splitting UI similar to the illustrations of FIGS. 6A-I, where a photo or image of a particular bill can be associated with a photo or image of two or more persons, with line items from the bill being split among the particular persons. Further descriptions of such a solution are described in reference to FIGS. 5 and 6A-I. The illustrations of the UI may be presented, for example, in GUI 156, and the photos or images may be captured by camera 158*a*. Alternatively, the client application(s) 160 may use a proxy or representational image for a payment request as opposed to one taken contemporaneously to the bill or other incident of payment associated with the payment request. The proxy or representation image may include an image of one or more persons, at least one of which can act as a proxy for at least one other payment-related person or entity. For example, an image of a teacher may be used to send a payment to school.

In other instances, a stock or older picture of a person (e.g., a family member) may be used to generate a payment request from that person, even when the picture or image is not directly related to the associated bill or purchase for which the payment request is initiated. In some instances, the stock or older picture of a person may be such that facial recognition on the persons may not be accurate (e.g., based on the person's aging, facial changes, etc.), or where the picture or image used does not include the person at all. In some instances, persons may be associated with images that are not photos of the person, such as cartoons, illustrations, photos of other objects or scenes, as well as others. The association may occur based on a connection provided by the person initiating the payment request (e.g., at or before the time of the request), by the person with whom the image is to be associated (e.g., based on a person's social media profile picture or image, or where the photo is explicitly connected in the bill pay system or based on connections created to the social media profile). In some instances, the picture or image used in lieu of a current image may be an existing photo or image in a user's photo library (e.g., on a mobile device, on a desktop computer, from an online repository etc.), an image selected from a connected social media network (e.g., Facebook), or an image or photo previously-used in bill payment requests (e.g., where the bill payment system retains the image or photo).

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Further, while the facial recognition and analysis is managed at the payment system 102 in FIG. 1, alternative implementations may perform at least some of the recognition and analysis at the client 150, or alternatively, at one or more systems and/or services external to the payment system 102, such as third-party facial recognition and verification services (e.g., governmental services, private services, etc.).

Figure 2:
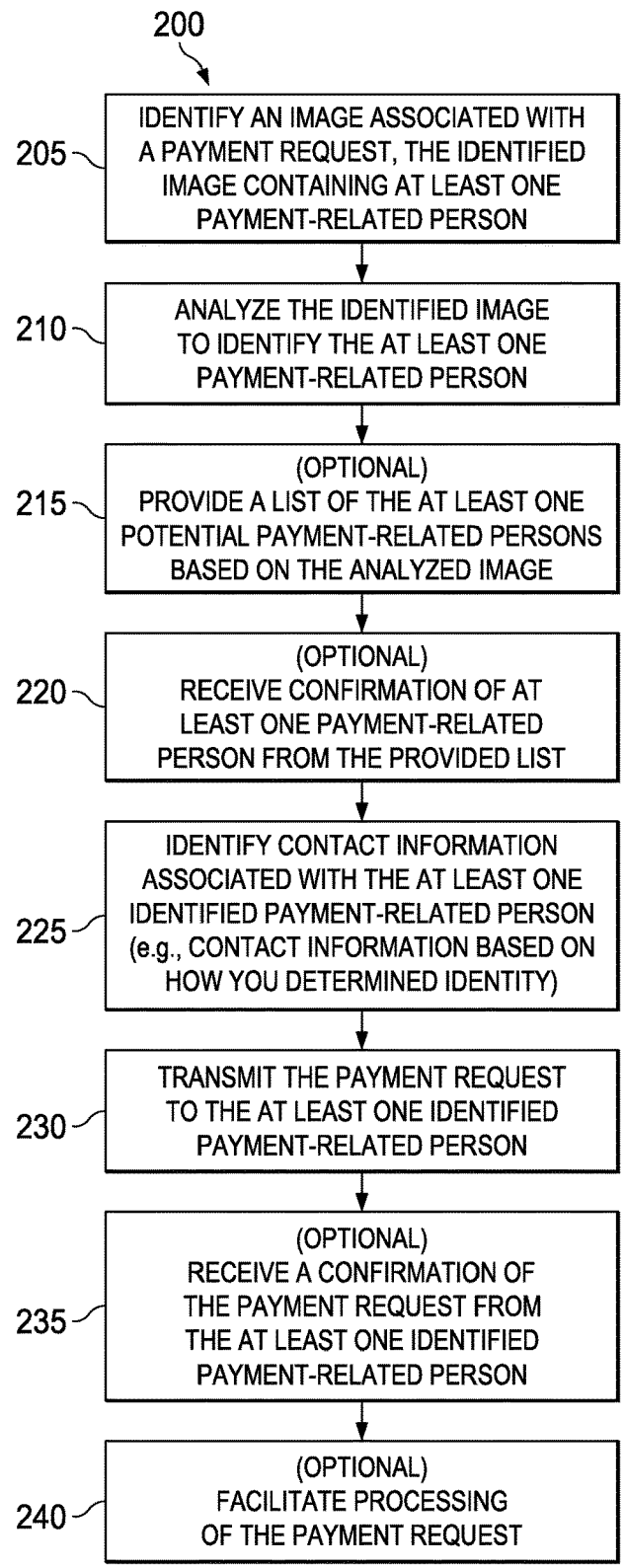
FIG. 2 is a flowchart of an example operation related to sending payment requests to one or more persons or entities based on images in which the persons or entities appear.

FIG. 2 is a flowchart of an example operation 200 related to sending payment requests to one or more persons or entities based on images or images in which the persons or entities appear. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

At 205, an image associated with a payment request is identified, wherein the identified image contains at least one payment-related person or entity in the image. The image may be a photo in some instances. The payment request and image may be received from a mobile device. In some instances, the mobile device may have taken the image with a camera integrated with the mobile device, while in other instances, the mobile device may identify a pre-existing or a prior-taken image to be included with the payment request. In some instances, the payment request may be received from a non-mobile device, such as a desktop computer. The identified image may be an image downloaded to or saved on the non-mobile device. In some instances, one or both of the mobile and non-mobile devices may have one or more applications capable of identifying the image and/or sending the payment request. The operations of method 200 may be performed, at least in part, at the mobile or non-mobile device, as well as at a system physically remote from the mobile or non-mobile devices.

Each payment request includes a value for which payment is requested. For example, the value in a first payment request may be an amount identified using monetary funds, such as dollars, euros, or another denomination. In other instances, the value requested may be a non-monetary or non-traditional monetary amount, such as credits, goods, or services. The credits may include minutes or data from a cellular or wireless provider plan, Bitcoins or another crypto-currency, as well as any other suitable credit. In some instances, the value included in the payment request may be a good or service that cannot be easily transferred electronically, such that the actual transaction and transfer to complete the payment request may be performed manually via face-to-face interaction or over a communications medium, either providing the goods or services directly, by shipping goods, by performing services remotely, or by shipping goods from one to another.

At 210, the identified image is analyzed to identify the at least one payment-related person. In some instances, one or more persons in the identified image may be omitted from a payment request facial recognition determination. For example, an initiating user can manually identify particular faces or persons within the image who should not be included in the analysis. During the analysis, those persons and their faces will not be considered by the analysis. For those remaining persons to be analyzed, facial or other recognition processes can be performed to identify those included in the payment request. In some instances, the persons may not be known to the initiating user, either within their personal contacts or based on prior relationships (e.g., via social network). In those instances, the system can still perform operations capable of determining the recipient based only on the identified image. The details of the analysis may vary, although one example set of operations is illustrated in FIG. 3.

Figure 3:
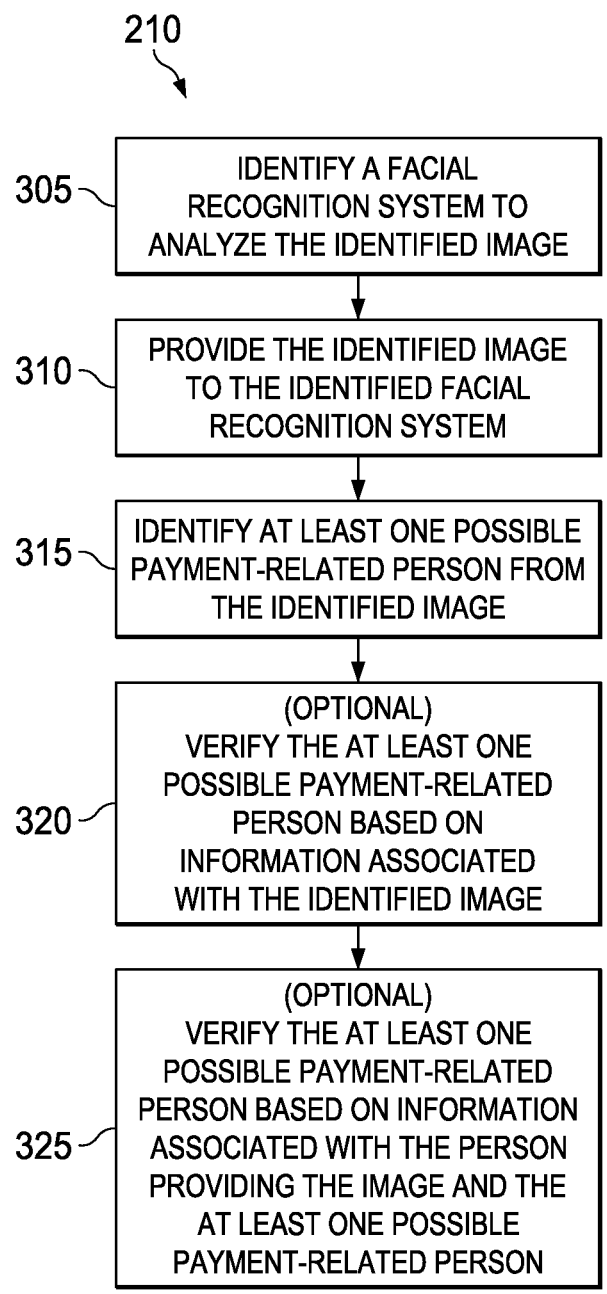
FIG. 3 is a flowchart of an example operation related to analyzing and verifying potential identities of persons included in the images.

Specifically, FIG. 3 is a flowchart of an example operation 210 related to analyzing and verifying potential identities of persons included in the images. While example operations are shown, the actual operations may vary based on particular implementations of the system and operations.

At 305, a facial recognition system for analyzing the identified image is identified. In some instances, the facial recognition system may be local to a payment processor managing the analysis, or the facial recognition system may be local to a mobile device initiating the payment request. In other instances, the facial recognition system may be an external service or source, such as a social network or third-party service. In some instances, more than one facial recognition system may be used concurrently or sequentially. For example, a local system may be used, where an external system is then used if no reliable matches are returned by the local system.

At 310, the identified image is provided to the identified facial recognition system. At 315, at least one possible payment-related person from the identified image is identified. In instances where the identified image includes multiple (and non-omitted) persons, the process may be performed multiple times before completing.

At 320 and 325, the at least one identified possible payment-related person may be, optionally, verified. The operations of 320 and 325 describe several possible verification techniques, although numerous other techniques may also be used, where appropriate and available. Some, all, alternative, or no verification techniques may be implemented in different situations.

At 320, a verification of at least of the identified possible persons can be performed based on information associated with the identified image. For example, the identified image may be a data file having a set of metadata associated with it, including a location where the image was created or where a photo in the image file was taken, as well as a time the image was taken. In some instances, this, or other information associated with the image (e.g., image metadata), can be used to verify, or support, the identity of the identified possible person. In one example, the location of the identified person at the time of the image may be determined and compared to the location of the image. In some instances, information from or associated with a mobile device of the identified person can be used to determine the person's location at the image time. Social network check-ins, status updates, and messaging information may also be used to determine location. Still further, and in addition to other suitable options, purchase history from a credit card, automated teller machine (ATM), or other external service may also be used to verify location. Alternatively, location information embedded in or associated with the identified image, such as GPS-based metatags or other metadata, may also be used to verify location.

At 325, a verification of the at least one possible persons can be performed based on the person initiating the payment request and providing the image. Specifically, the initiating user's current and/or prior locations may be used to cross-reference the current and/or prior locations of the identified potential person to determine whether such locations overlapped. Similarly, even if the image does not include location metadata, information from a social network tagging both the initiating person and the identified potential person at a common location or event may provide sufficient verification. In some instances, such persons may be separately tagged or checked-in at a particular location within relatively close times. In those instances, such information may act as a verification that the identified person was present and a potential payment request recipient.

The verifications required to confirm the identified persons may vary in each implementation, and per image and/or payment request. For example, if the initiating user and the identified possible person are related via social networking, particularly to a threshold degree, such verifications may not be used. Conversely, where no known relationship between the initiating user and the potential person are identified, significant verifications may be necessary to confirm the payment request.

Returning to FIG. 2, at (optional) 215, a list of the potential payment-related persons identified from the image may be provided to the initiating user. In one instance, the image of the person from a facial database as determined during the analysis can be compared to the person from the identified image. One or more potential persons may be included in the list. At (optional) 220, confirmation of the at least one identified possible person from the provided list may be received.

At 225, contact information associated with the at least one identified person is identified. In some instances, the information may be known and/or obtained via the same facial recognition technique used (e.g., via the social network). Contact information may be used to send the payment request to the identified recipient as needed. In some instances, the contact information used for a particular person would be based on the online location from which the person was identified. If the person was identified using a local image or facial database, local contact information may be used. Alternatively, if the facial recognition identified the person based on a social network, the contact information provided there may be used. Still further, if the analysis process identified the person based on a professional profile page, contact information extracted from that location may be used.

At 230, the payment request can be transmitted to the at least one identified person via the identified contact information. At (optional) 235, a confirmation of the payment request from the at least one identified person may be received. In some instances, no confirmation may be necessary, such as where the person is known, along with bank or other account information, and the payment request relates to a request to pay the identified person. In those instances, no confirmation may be necessary before depositing the value into the identified person's account.

At optional 240, the processing of the payment request may be facilitated in response to a confirmation to perform the payment processing, or where no confirmation is needed, upon transmitting the payment request. Method 200 can use any suitable payment processing functionality or service, including those of Visa, MasterCard, PayPal, and others.

Figure 4A:
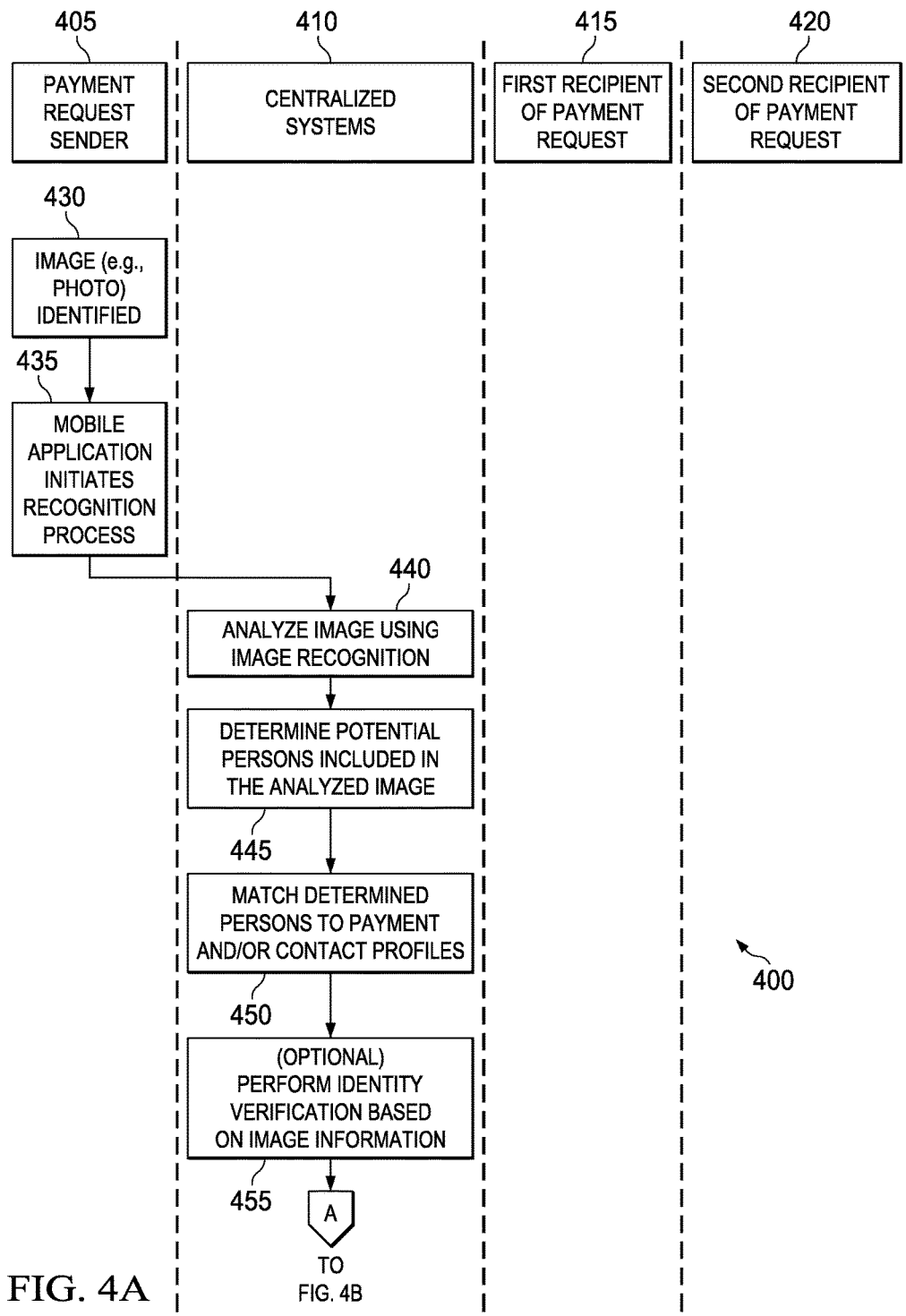
FIGS. 4A and 4B are a combined swim-lane diagram illustrating example operations related to actions for sending payment requests to one or more persons or entities based on images in which the persons or entities appear.
Figure 4B:
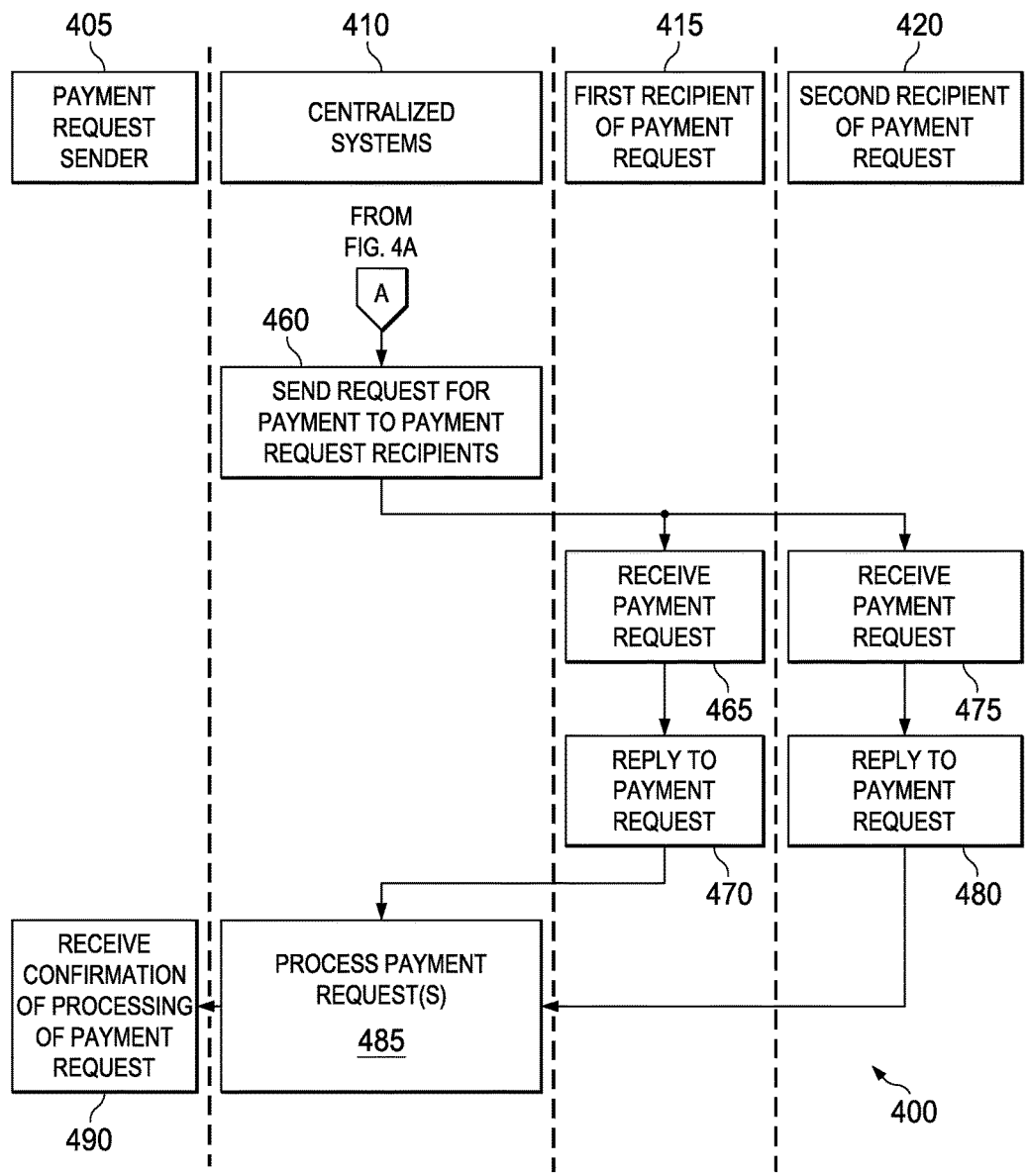

FIGS. 4A and 4B are a combined swim-lane diagram 400 illustrating example operations related to actions for sending payment requests to one or more persons or entities based on images in which the persons or entities appear. The payment request sender 405, the first recipient of the payment request 415, and the second recipient of the payment request 420 may be associated with one or more mobile devices in this example, where the persons can perform the operations at the mobile devices. Centralized systems 410 can represent the payment system 102 and any third-party systems 170, as well as other or alternative systems to perform the described operations.

At 430, the payment request sender can identify (e.g., capture or select) an image to use when performing a image-based payment process. At 435, a mobile application associated with the image-based payment process can initiate the recognition process. In general, the mobile application may only need to identify a single picture and a value to be requested (whether to pay another or requesting payment from another). The sender may also identify one or more faces/persons included in the image to omit from the analysis via the mobile application.

At 440, the image is analyzed using image and/or facial recognition, and at 445, determines one or more potential persons included in the analyzed image. At 450, one or more persons are matched to the image, and their corresponding contact information/profile and/or payment information is determined. At 455, identity verification of those determined in 445 and 450 may be optionally performed. In some instances, there may be multiple levels of verification based on initial determinations and analysis. For example, verifications may be based on a known relationship between the persons (e.g., via a social network). Depending on the level of relationship, the location and timing of or associated with the image may be compared to information known about the possible persons identified from the image. Additional, and varied, levels of verification can be performed.

At 460, the centralized systems 410 can send a request for payment to the payment request recipients as determined by the analysis operations and, optionally, as verified by the verification operations. The payment requests may be sent via any suitable channel, including as a push notification to a mobile device of the one or more recipients, to email addresses of the one or more recipients, to text addresses of the one or more recipients, to a social network inbox or messaging application of the one or more recipients, among others.

As illustrated, the first (415) and second (420) recipients receive the payment requests at 465 and 475, respectively. At 470 and 480, respectively, the first and second recipients can reply to and/or confirm the payment requests. Such replies may be unnecessary in some instances, such that upon sending the payment notification (or before sending the notification), the payment request can be processed at 485. Upon processing the payment, the centralized systems 410 can send (at 490) a confirmation that the payment request has been processed to the sender 405.

In some implementations, additional operations may be performed upon the image being used to initiate the payment request. For example, once payment is successfully used to facilitate payment, the image can be modifying by embedding one or a series of pixel modifications to the original image, thereby providing and indicated a record of the image being used as payment initiation. Pixel modification can include generic data such as payment amount and/or the date completed. Such information can be provided back to the initiating user by returning the image after completion. Additionally, if the image is stored for use in one of the source databases for facial recognition, the information stored within the image may be used to verify and/or maintain a record of the identified user's prior activities within the payment systems. Still further, by storing a modified version of the original image, future submissions of the original image may be denied outright or result in a notification that the image has previously been used and a transaction completed.

Figure 5:
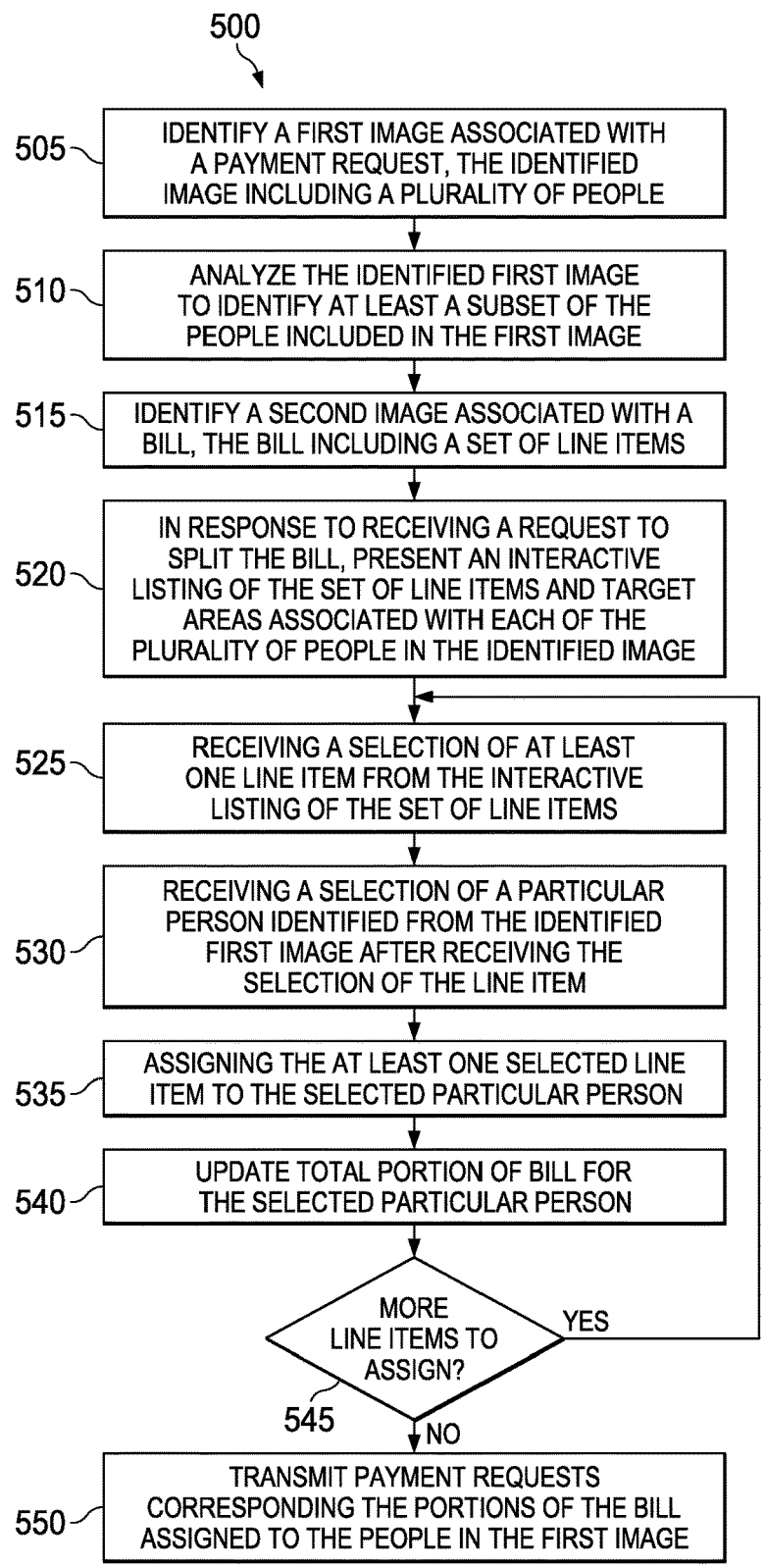
FIG. 5 is a flowchart of an example operation related to splitting a bill among a plurality of persons based on an image in which the plurality of persons appear.

FIG. 5 is a flowchart of an example operation 500 related to splitting a bill among a plurality of persons based on an image in which the plurality of persons appear. For clarity of presentation, the description that follows generally describes method 500 in the context of the system 100 illustrated in FIG. 1. However, it will be understood that method 500 may be performed, for example, by any other suitable system, environment, software, and hardware, or a combination of systems, environments, software, and hardware as appropriate.

At 505, a first image associated with a payment request is identified, where the identified first image includes a plurality of people. At 510, the identified first image can be analyzed to identify at least a subset of the people included in the first image for association with one or more payment requests. The first image may be taken contemporaneously with a bill being split using the described UI and techniques, or the first image may be a stock or pre-existing photograph or image including the persons. Where the first image is taken at the time of the bill, one or more verifications of the image and bill may be performed as described above, including a determination of the location of the photo, the location of the bill, and other information related to the persons. When the first image is not taken at the time of the bill, one or more verification actions may be performed based on the persons identified in the first image, including based on their location information related to the bill, their status information on one or more social networks, and other suitable and appropriate information.

At 515, a second image is identified, where the second image is associated with a bill to be split. The bill can include a set of line items. An example bill may include a receipt from a restaurant, bar, store, or other retail establishment. In many instances, the line items may be particular items on the bill that can be associated with a single person in the first image. For example, if the line items represent items ordered at a restaurant, such as entrees, sides, appetizers, and/or desserts, each item may be separate associated with particular persons. In some instances, individual items may be split between two persons such that the charge for a single line item is split or requested to be split. In some instances, automatic operations, such as optical character recognition (OCR) and other parsing technologies may be used to identify line items in a bill such that particular line items can be individually selected and associated with particular persons from the first image.

At 520, in response to receiving a request to split the bill identified in the second image, an interactive listing of the set of line items from the bill is presented along with images and/or target areas associated with at least some of the persons included in the identified first image. In some instances, a cropped image of each persons' head may be provided, while in others, a target area may be provided for users to associate bill line items with the persons associated with the target areas. In some instances, the request to split the bill may be associated with a button or indication from a first presentation of the first image and the second image to an updated interactive presentation where the specific line items can be associated with the persons in the first image. As noted, each line item may be individually selectable after the second image of the bill and its line items is analyzed. In some instances, an overlay UI object may be created, where the overlay UI object is presented on top of the second image, and wherein the overlay UI object includes a plurality of selectable objects, where each of the selectable objects corresponds to and is associated with each of the line items identified in the bill. The selectable objects can be selected by the user and used to assign particular line items to particular persons.

The illustrated example of FIGS. 6A-I show that the first image and second image may be initially selected in a UI and presented next to one another, and that particular UI interactions may be used to assign individual line items to particular persons, either through mouse-based interactions, touch-based gestures or input, or other input operations. Further description of FIGS. 6A-I are provided below.

At 525, a selection of at least one line item from the interactive listing of the set of line items is received. Multiple line items may be selected, such as by a combination touch or mouse input, as well as by other suitable input. At 530, a selection of a particular person identified from the first image is received. At 535, when the selection of the particular person is received after the selection of the line items, then the selected line items may be associated with the particular person and included for a later payment request associated with the particular person. In some instances, the selection of the particular person may be made prior to receiving the selection of the bill line items, such that the selection of the line items is the last operation before the assignment of the line items to that particular person. The illustrations herein are meant as an example implementation, and particular instances may allow either the line item or the particular persons to be selected first or second. Once the assignment/association of the line items and the particular person is made, at 540 the total portion of the bill for the selected particular person is updated based on the costs associated with each of the line items. In some instances, taxes and/or gratuities (where applicable) may be automatically assigned to the particular person based on the portion of the bill and the line items assigned at 535. Alternatively, amounts of taxes and/or gratuities may be manually assigned, modified from automatically assigned amounts, or changed as requested by the user. In some instances, a related showing of the remaining amount to be assigned may also be shown, where the remaining amount is decreased by the costs associated with the line items assigned at 535. For example, where the total bill is $100 and $40 worth of line items are assigned to a first user, then the first user's total portion of the bill may be presented as $40, while the remaining amount to be assigned is reduced to and presented as $60.

At 545, a determination is made by the tool and operations as to whether additional line items are to be assigned or are waiting to be assigned. If additional line items have not been assigned, then method 500 returns to 525. As noted, 535 and 530 may be performed in any order. As additional line items are selected and assigned to particular persons, the entire (or portion of the) bill can be applied. In instances where the bill has already been paid by a first person, only the portions associated with other persons may be assigned and payment requested. In those instances, the determination as to whether additional line items are to be assigned may not be based solely on whether every line item is assigned, but instead whether each line item associated with a person other than the original payor of the bill has been assigned. When it is determined that no additional line items are to be assigned, method 500 can continue at 550. At 550, possibly in response to a user selection to finalize the bill split, one or more payment requests corresponding to the portions of the bill assigned to the particular persons in the first image can be transmitted. The transmission of the payment requests may be made similar to the requests described in FIG. 2 at 230. For example, contact information related to the particular persons identified in the first image and associated with at least one line item from the bill can be used to send proper payment requests to those persons, their financial institutions, or to any suitable location associated with those persons where the requests can be received and, in response, confirmed and paid, where appropriate.

In some implementations, taxes and/or gratuities (e.g., tips) can be added to or considered in the bill splitting operation. In one instance, based on a known tax rate, for example, taxes and/or gratuities associated with a particular bill may be calculated and split as the line item assignments are made, providing proportional distribution of the taxes and/or gratuities to the persons associated with the bill pay based on the items with which they are associated. In some instances, the gratuities may be split in a different manner as assigned by the user requesting payment (e.g., based on agreement of the payors). In some instances, the taxes and/or gratuities may be included as items are assigned, or they may be included once all assignments are made.

FIGS. 6A-I are example screenshots providing an illustration of one implementation of a bill splitting mechanism and user interface. The illustrations of these figures are meant to be illustrative, not limiting. A person of skill in the art will understand the various illustrations as examples of possible implementations, and not as requirements for how particular UIs and operations may occur.

Figure 6A:
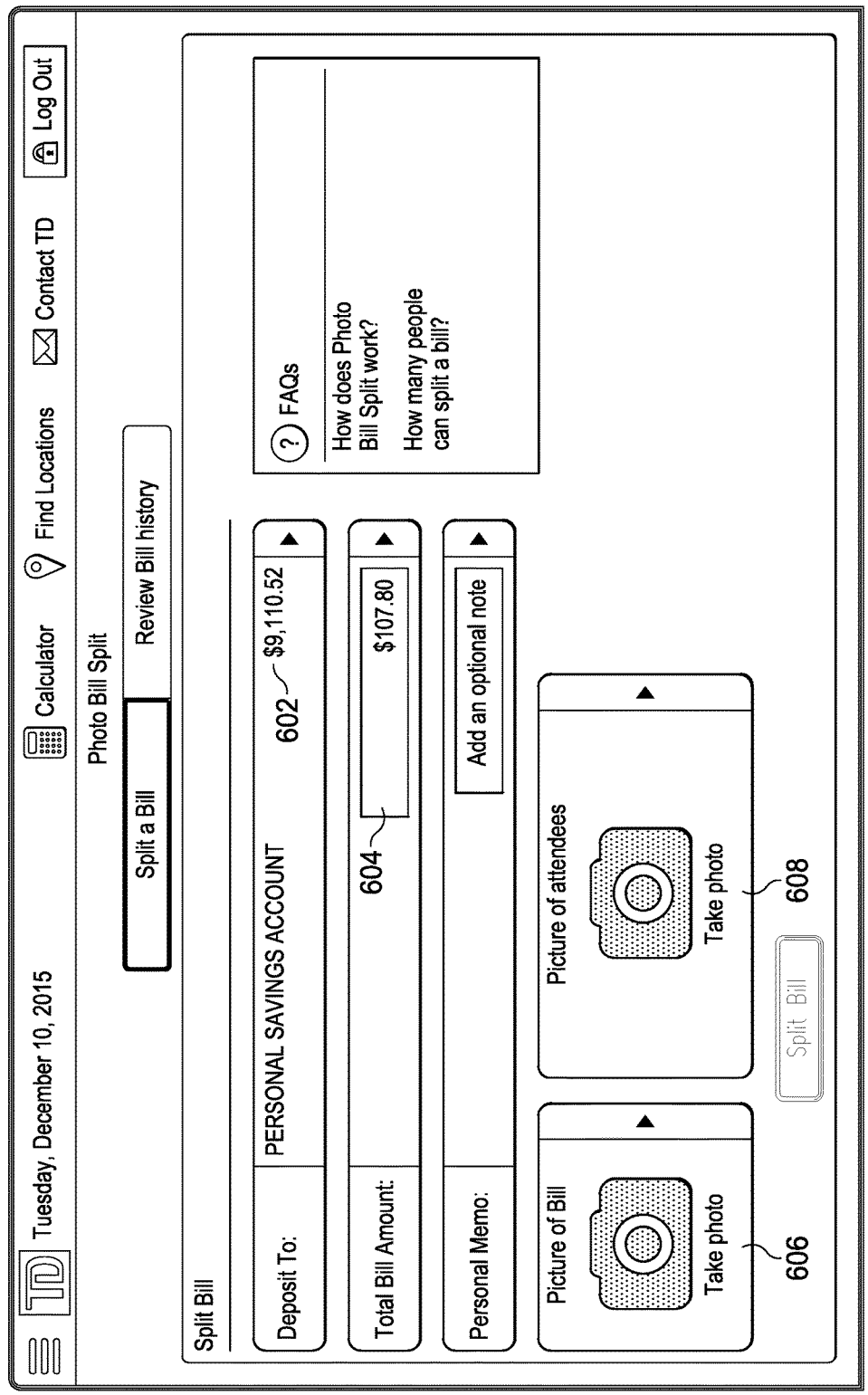

FIG. 6A provides an initial illustration of a photo bill split UI allowing users to identify a picture of a bill and a picture of one or more persons, such as attendees at an event or other get-together where the costs associated with the bill were incurred. The UI allows users to identify information about the bill and split, among a plurality of persons, the costs that correspond to the user's order, selection, or spending. The illustrated version is an implementation within a tablet device, such as an Apple iPad app or web page. Alternative implementations in mobile devices, standard browsers, mobile and online banking sites, and other situations may also be used.

In FIG. 6A, a user who initially paid the entirety of the bill may be submitting the bill for splitting and repayment by one or more other persons. As shown at 602, the user may identify a particular account at which the requested payments are to be directed by the system and application. The user can identify a total bill amount 604 (e.g., $108 in the present illustration), which identifies the amount to be split. Two locations for identification of the bill and the photo to be used in the bill split can be provided, here as 606 and 608, respectively. In some instances, users may be able to input the bill and/or photo in either of the locations, while in other instances, the locations may be specifically programmed and/or designed to accept a single type of input. Photos of both the bill and the attendees or persons to request repayment from may be photos stored on the mobile device of the user, stored in memory, or located in a cloud storage, where the locations are selectable after interaction with the appropriate input location 606, 608. Alternatively, users may interact with the locations 606, 608 and actively take a picture from the device's camera, capturing the bill and/or image of the persons while interacting with the page.

In the second illustration of FIG. 6B, the input location 606 associated with a photo of the bill to be split is selected, and a photo of the bill 610 to be split is provided. In this example, the user can actively take the photo of the bill 610 at the location where the bill was received. When button 611 is pressed, the photo can be taken and the photo of the bill used as the input to the bill split process. As noted, the user may instead have selected a stored picture of the bill from any suitable location, such as local or remote storage. There is no requirement that the bill split process be performed at the location where the bill was incurred, although immediately processing the bill split can be advantageous in that the split can be set and paid by the other persons while still at the location. Once the photo is selected, the UI can return to the presentation of FIG. 6C.

Figure 6C:
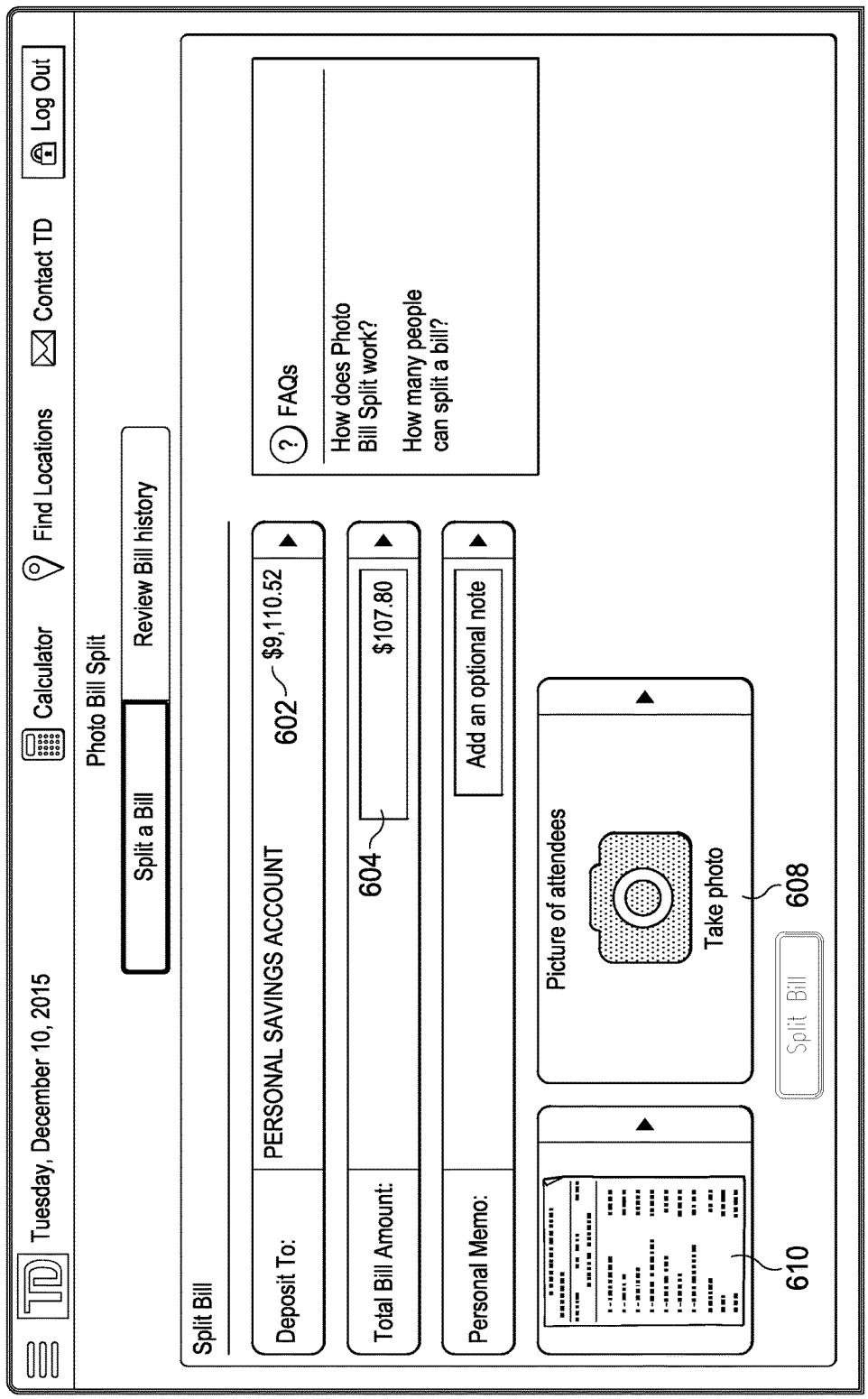
Figure 6E:
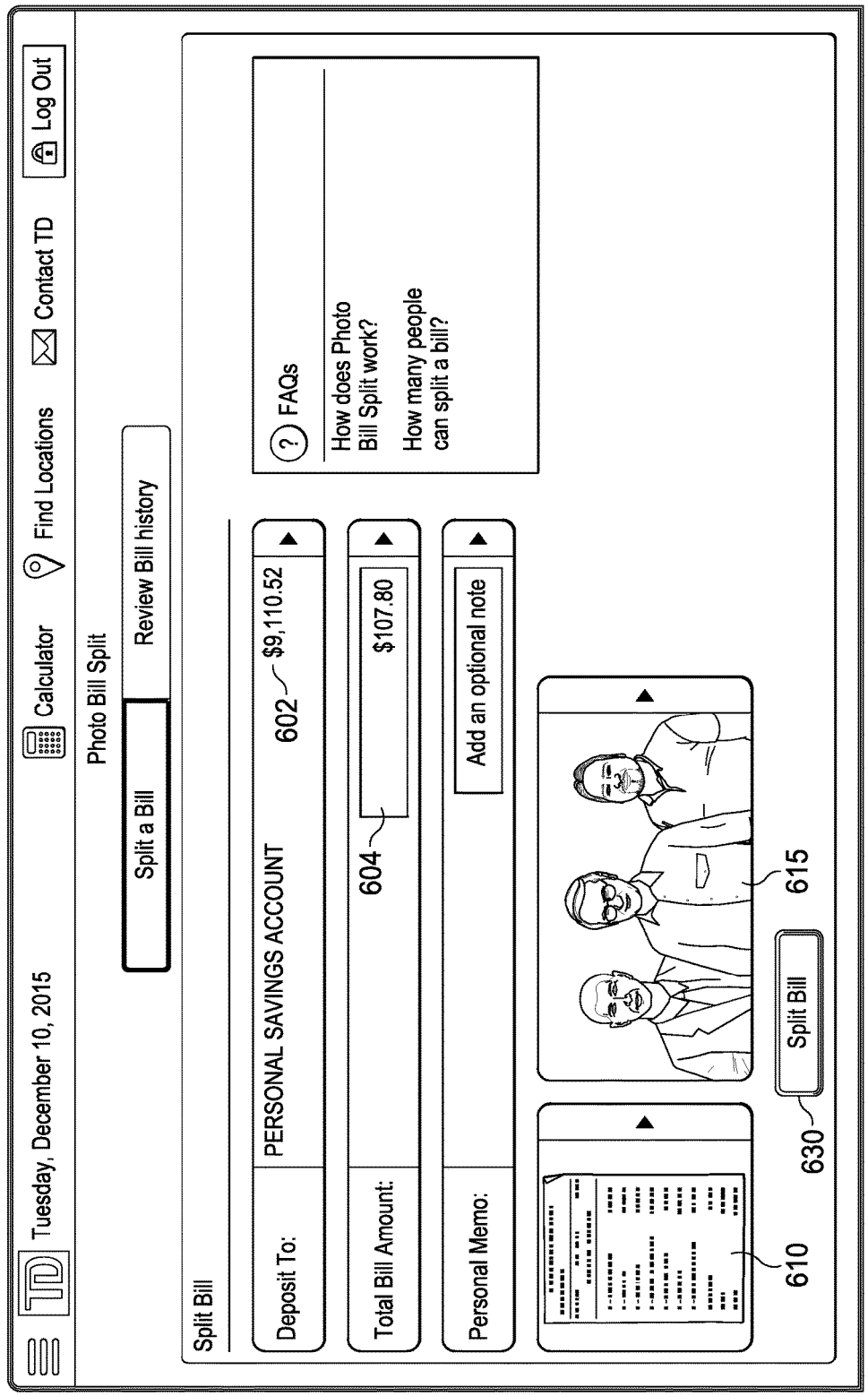

In FIG. 6C, the original UI of FIG. 6A is presented, with the modification that the image of the bill 610 selected in FIG. 6B is represented at the input location 608 now. After selecting the bill 610, the user can select input location 608. Once selected, the user can select and/or capture an image or photo of the persons with whom the bill is to be split as illustrated in FIG. 6D. The photo 615 of FIG. 6D includes three persons, person 618, 620, and 622. In some instances, one of the persons may be the user submitting the payment request, while in others, the persons may be at least some of the persons with whom the user is splitting the bill. When the photo is ready to be selected, the user can activate button 616 and the photo is captured. As noted, the photo 615 may be taken at the time of the submission, or the photo 615 may be accessed from local or remote storage. Once selected, the UI can return to the UI of FIG. 6E, where both the photo of the bill 610 and the photo of the persons 615 with whom the bill is to be split are shown. If the user is satisfied with the selection, the split bill button 630 can be selected.

Figure 6F:
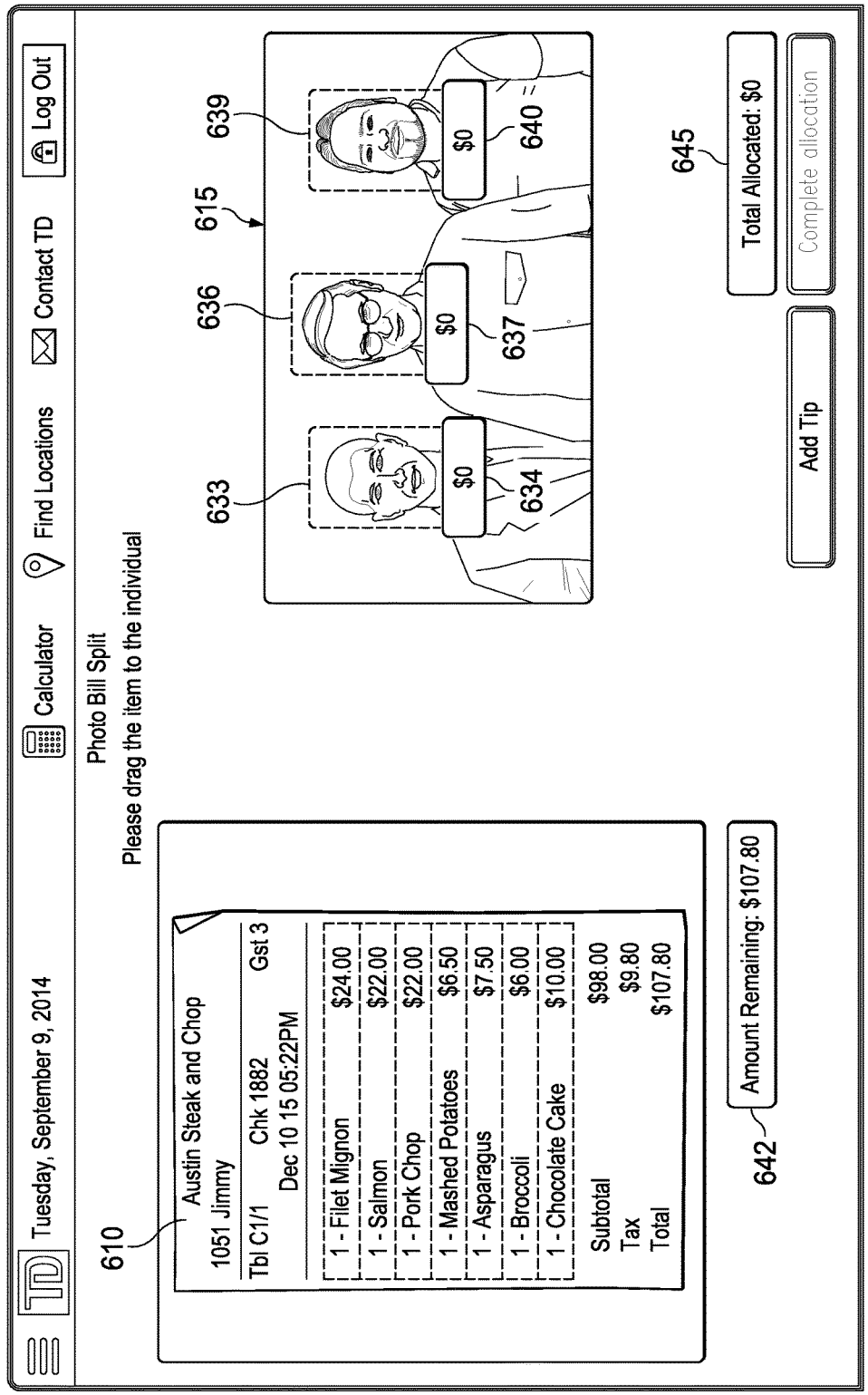

In response to the selection, the UI of FIG. 6F can be presented. As illustrated, the photo 610 of the bill and the photo of the person 615 for splitting the bill can be shown adjacent to one another. As illustrated in 610, the various entries or line items in the bill can be individually selectable. In some instances, an OCR or similar technique can separate the line items and associate them with their corresponding price as listed on the bill. The individual line items can then be made selectable, such that a drag or click of the item allows the item to be assigned to a particular person from the photo 615. For example, the selectable items may be shown with dotted lines, color coding, or other indications that the entries are selectable. In some instances, for example, radio buttons, selection boxes, or other indicators may be available to further indicate or confirm a selection. Still further, after selection, shading and color-coding may be used to show when a particular line item has been selected, as well as whether multiple line items are selected. Once selected, additional interactions can be used to associate the selected items with particular persons included in the photo 615.

As further illustrated, each of the persons 618, 620, and 622 in the photo 615 may be associated with a target area, such as their facial area, on the presented photo 615. As shown person 618 corresponds to target area 633, person 620 corresponds to target area 636, and person 622 corresponds to target area 639. Selections of the particular target areas 633, 636, 639 can be used to indicate particular persons within the photo 615 to whom one or more line items should be assigned. In some instances, the target areas may correspond to the entirety of the person in the photo or an area extended larger than only the facial area, as appropriate. In some instances, alternative means of selecting particular persons may also be provided, including a listing of the persons in the photo below, above, or to the side of the photo 615, where instead of the persons' faces particular line items can be dragged or otherwise added to the name of the persons.

FIG. 6F is an illustration of the bill pay UI prior to any associations being made between particular line items in the bill 610 and particular persons in the photo 615. Several elements show the amount of the bill remaining to be allocated (642), the total allocated (645), and the individual allocations associated with each person and their respective target (634, 637, and 640). As particular line items are assigned, the amount in each of the elements may be updated accordingly.

Figure 6G:
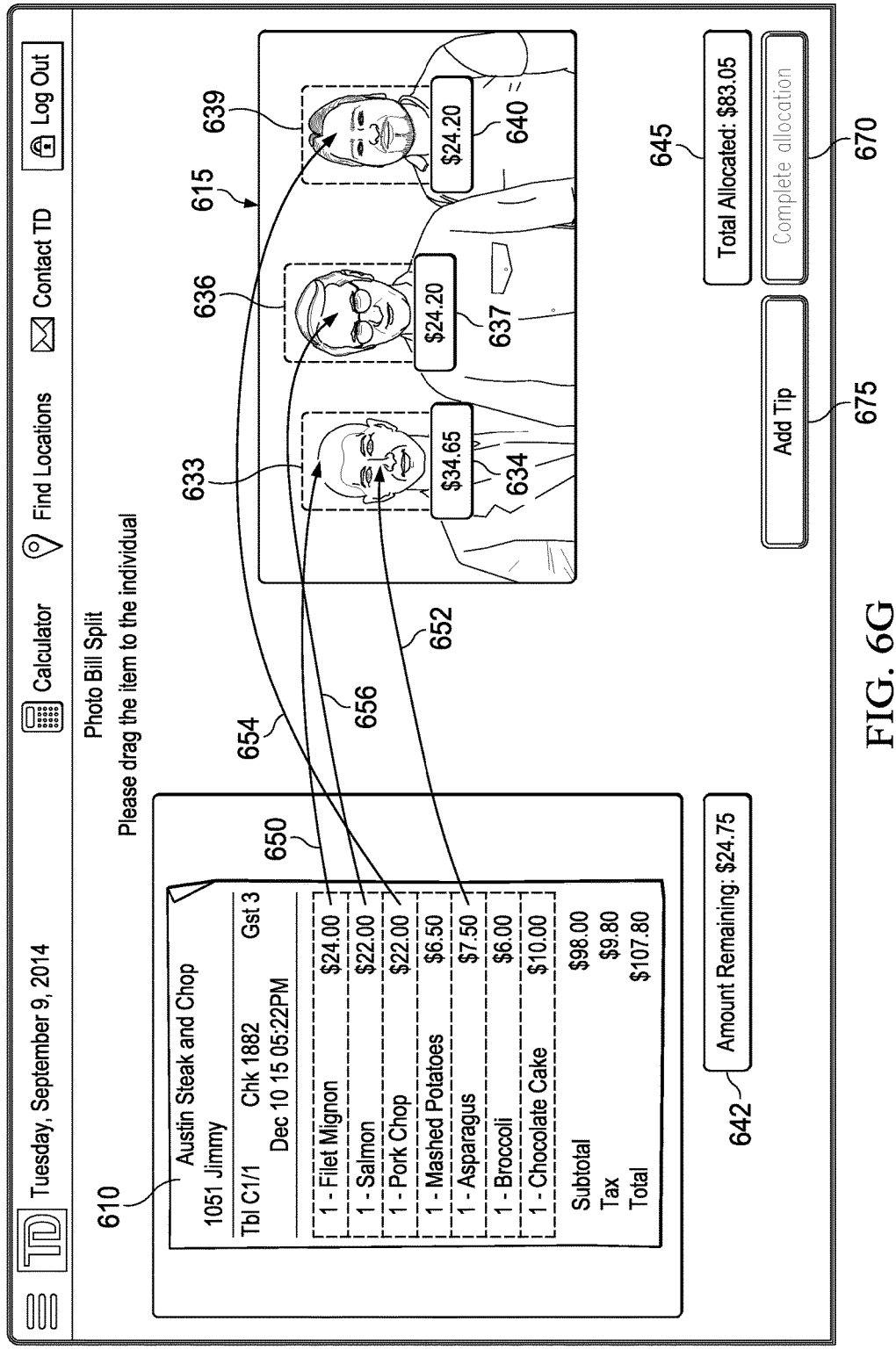

FIG. 6G is an illustration of the bill pay UI after several line items have been assigned. As illustrated, two line items have been assigned to the person 618 associated with target area 633 for a total of $34.65 as shown in individual allocation 634, one item has been assigned to person 620 associated with target area 636 for a total of $24.20, and one item has been assigned to person 622 associated with target area 639 for a total of $24.20. The assignments are shown by arrows 650, 652, 654, and 656, where arrow 650 shows an assignment of the filet mignon to target area 633, arrow 652 shows assignment of the asparagus to target area 633, arrow 654 shows assignment of the salmon to target area 636, and arrow 656 shows assignment of the pork chop to target area 639. The arrows may represent drag from the selected line items to the target areas or any other suitable interaction, including mouse or touch-based drags, multiple click-based selections, voice-based interactions, or any other suitable selection and association. Once the selections are made, element 642 shows that $24.75 of the original $107.80 remains to be allocated, while element 645 shows that the total allocated amount at this time is $83.05.

In some instances, and as illustrated in various figures, bill 610 may include an indication of a number of guests associated with the particular bill 610 as entered, for example, by a hostess, waiter, or the provider of the service or goods. One implementation of the present solution can use the number of guests to validate the photo 615 and the number of persons present therein. For example, the system may identify the number of guests identified by the bill 610 and ensure the number of people included in the photo 615 match that number. This addition is optional, as in some instances, one individual may not be paying a portion of the bill 610 or will not be associated with any of the particular line items being split. In some instances, an optional confirmation step may be added such that if the number of identified people in the photo 615 is less than N−1, where N equals the number of guests identified on the bill, a confirmation is required for use of the photo 615 with the bill 610. The use of N−1 as the threshold may be used as the person taking the picture may not be included in the picture. Having more persons in the photo than guests identified by the bill 615 may not be an issue, as the bill can be split in any manner. In some instances, single line items may be split into multiple assignments, allowing for split items, such as shared meals, shared gifts, etc.

Figure 6H:
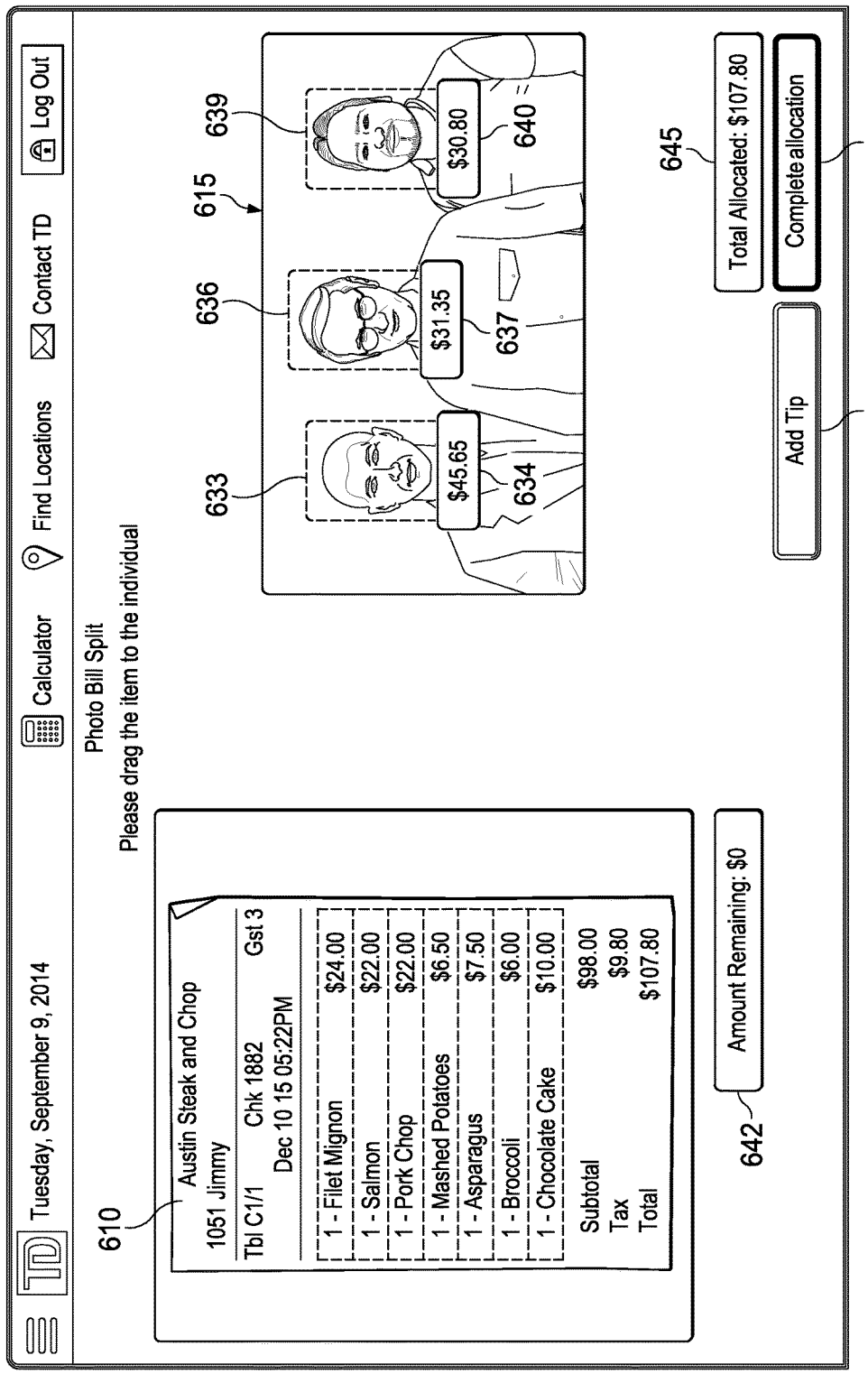

FIG. 6H illustrates a completed assignment of line items to particular persons and their target areas. As shown, no further assignments are required as element 640 indicates that all line items have been assigned, indicating $0 remaining. Further, element 645 shows the total amount of $107.80 as assigned, with $45.65 assigned to person 618 (as shown by 634), $31.35 assigned to person 620 (as shown by 637), and $30.80 associated to person 622 (as shown by 640). If desired, changes to the assignments can be made by reselecting a particular line item and associating the entry with another target area in the photo 615. As illustrated in FIGS. 6G (and 6E and 6F), an option to add a tip is provided via button 675. The tip button 675 can allow a percentage to be added to the entire bill or to individual persons' totals. When added to the entire bill, the tip can be split proportionally according to the amounts associated with each person, with options to change or modify the individual amounts as agreed. In some other instances, similar determinations and assignments can be made for any taxes associated with the assigned line items. Such taxes can be assigned automatically based on a known tax rate and the items assigned to particular persons. The complete allocation button 670 finalizes the split. In some instances, the complete allocation button 670 may only be available when element 642 indicates that the amount remaining to be assigned is $0. Upon activation of the complete allocation button 670, the UI can move to the summary of allocations UI of FIG. 6I.

Figure 6I:
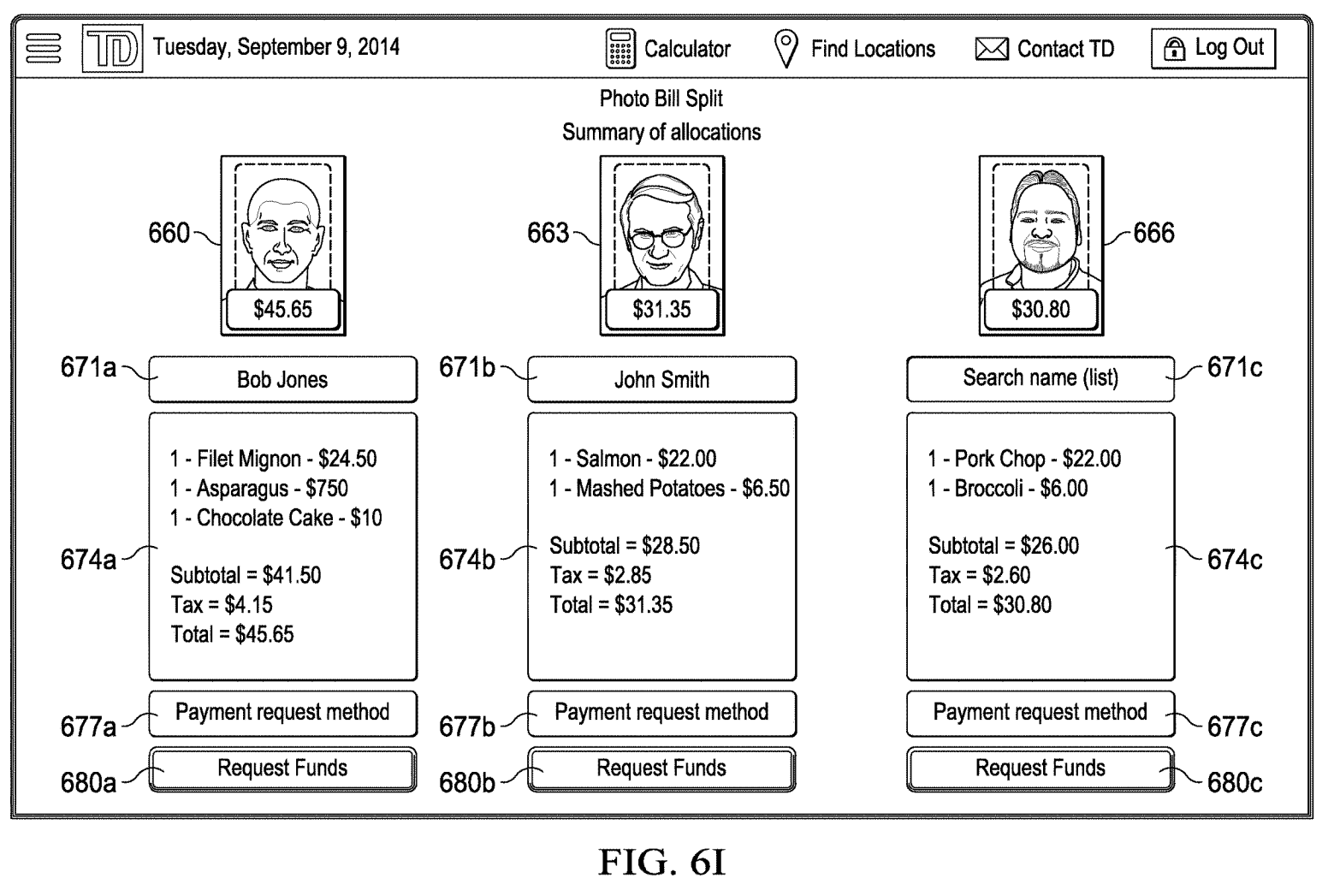

FIG. 6I represents a final summary page of the allocations before the bill pay split amounts are submitted via the bill pay system to the persons associated with the photo 615 and assigned one or more line items from the bill. As illustrated, a column for each person 618, 620, 622 may be provided. Thumbnails 660, 663, and 666 provide a final image of the facial area of the corresponding person as well as a summary of the amount assigned to the person. In the name entry areas 671a-c, a name generated by the backend facial recognition system and associated with the corresponding person may be presented. In 671a, person 618 is identified as "Bob Jones," while in 671b, person 620 is identified as "John Smith." In 671c, the person 622 associated with thumbnail 666 may not be identified by the backend system. In such instances, users may enter a name, receive a list of potential matches, or perform an alternative operation or action to identify the person. Here, a search of a contacts list stored locally on the device or accessed remotely can be searched and a manual entry of the name can be provided once the match is made. Summary areas 674a-c provide a summary of the line items associated with each of the particular persons, as well as the subtotal, taxes due, and total amount to be requested. The summary areas 674a-c can provide a final review of the assigned line items and allow users to return to the assignment interface if any incorrect assignments have been made. In areas 677a-c, a payment request method may be selected by the user. For example, if one or more of the users are also users associated with the bill pay scheme, the user assigning the splits may identify that they would like to be paid through the bill pay application. In those instances, notifications may be sent via the applications on those users' devices, where the amounts are paid via the applications on those users' devices. Alternatively, other payment methods may be provided, including PayPal, an email or web-based payment request (e.g., that provides a link to a web interface of the bill pay system), or any other suitable request method. Once the requests are appropriately set, the request funds buttons 680a-c may be activated to finalize and send the payment requests. In some instances, a single request funds button 680 may be available and used to send the payment requests simultaneously. Fund requests can be sent through one or more existing channels, including email transfer, credit and debit card transfers, direct fund transfers, and any other fund transfer or P2P payment system.

As noted, FIGS. 6A-I are merely example illustrations of possible UIs associated with the bill pay. The assignment of line items to particular persons including in the identified photo may be performed in any appropriate manner, including touchscreen inputs (e.g., dragging actions, sequential taps or touches, etc., on a touchscreen device), mouse or touchpad inputs (e.g., click-and-drag actions, sequential clicks, mouse gestures, etc.), verbal commands, or eye-tracking-based instructions, among others. Additionally, various orientations of various elements in the illustrated UIs may be used in different implementations. Still further, where one of the persons in photo 615 is the user submitting the payment request, the UIs may denote such information and remove the buttons associated with requesting payment from that user.

In some instances, the bill may be paid initially via the described photo bill split application and using the UIs. In those instances, the photo bill split application may identify a particular bill number and payment requests may be sent directly to the bill issuer (e.g., the restaurant, bar, store, or other seller or service provider) as opposed to sending amounts to one of the persons associated with the purchase and bill being split. In some instances, the photo bill split application may be built into mobile points-of-sale at the provider, such that the photo is taken by a server or salesperson.

In other instances, the user may have an option to split a bill equally among the persons identified for the bill split as opposed to selecting particular line items from the bill. In these instances, such as where the involved parties elect to split the bill evenly, an additional button or entry may allow all charges to be split. In some instances, the corresponding taxes and/or gratuities or tips may also be split up evenly, while in other instances, one or both of the taxes and/or gratuities or tips may be adjusted so that particular persons may be associated with a larger portion or percentage of the taxes and/or gratuities, while the split of the bill itself is equal.

Figure 7:
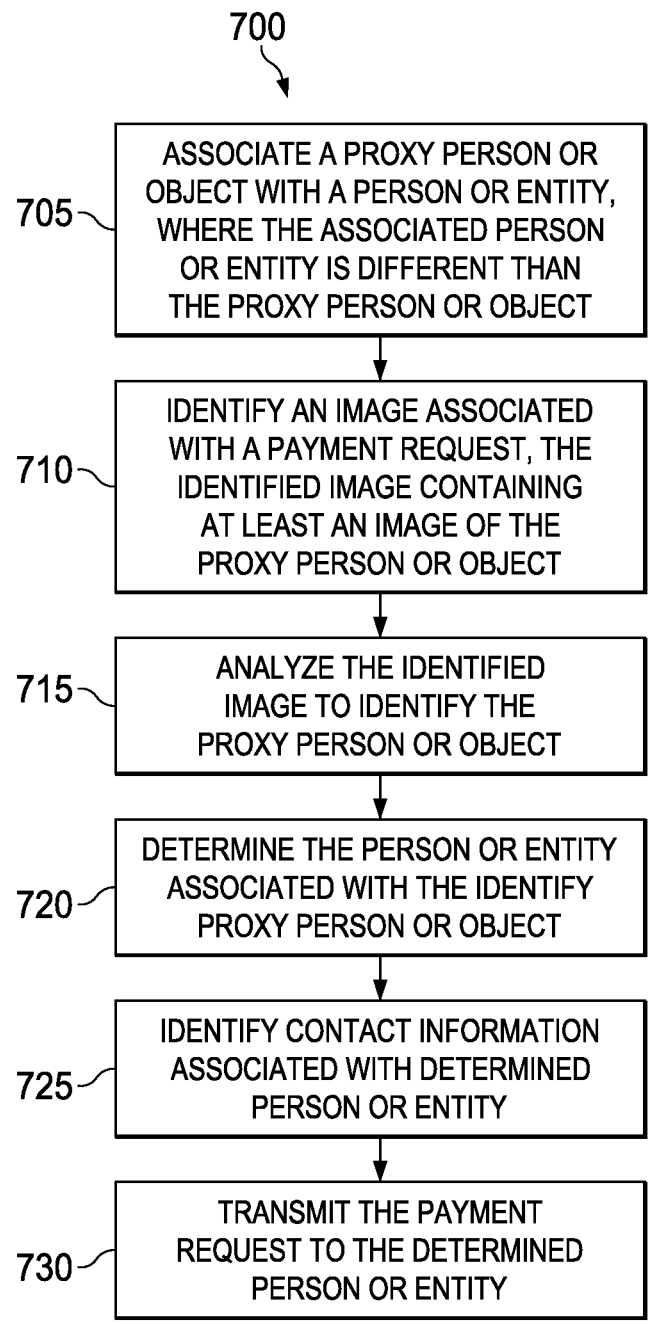
FIG. 7 is a flowchart of an example operation for using a person or entity included in an image as a proxy for a different payment-related person or entity in an image-based payment process and for a related payment request.

FIG. 7 is a flowchart of an example operation 700 for using a person or entity included in an image as a proxy for a different payment-related person or entity in an image-based payment process and for a related payment request. For clarity of presentation, the description that follows generally describes method 700 in the context of the system 100 illustrated in FIG. 1. However, it will be understood that method 700 may be performed, for example, by any other suitable system, environment, software, and hardware, or a combination of systems, environments, software, and hardware as appropriate. In general, FIG. 7 describes a situation where a particular person or object can be pre-associated as a proxy for another person, entity, business, or organization. In such instances, when the particular person or object is identified as included in a photo being used for a photo bill pay split situation, the associated person, entity, business, or organization is associated with the portion of the split bill as opposed to the person or object included in the photo. By using persons as a proxy for another person or entity, the bill pay split can be used in additional settings and instances to provide for an easy and time-efficient way to identify payees through their pre-defined or pre-associated representatives.

At 705, a person or object acting as a proxy is associated with another person or entity (e.g., a group, a family, a business, an organization, another person, etc.) in the bill pay split system, where the person or object acting as the proxy is different than the associated person or entity. In doing so, future images or photos of the proxy persons will cause any related payment requests to be routed to the pre-associated other person or entity using the pre-associated other person's or entity's contact information.

At 710, an image or photo is identified as associated with a payment request, where the identified image contains or includes at least an image of the proxy person or object, and where at least the proxy person is identified as related to the payment request. In some instances, the proxy person may not be associated with a payment request, such that no proxy-based connection to the other person or entity is required.

At 715, the identified image is analyzed to identify the persons included in the image, including the proxy person or object included in the image. The identification process performed can be similar to that described in FIGS. 1 through 4. For example, the identification process can be performed using a facial recognition-based determination and analysis. In some instances, one or more verifications of the identifications may be performed to verify the likelihood of the proxy person's relation to the bill being split.

At 720, a determination is made that the proxy person or object is associated with another person or entity, with that association being identified to determine the appropriate target for the payment request. Instead of the contact information associated with the proxy person, the contact information associated with the person to whom the proxy person or object is associated with can be identified and determined at 725 based on the determined connection between them.

At 730, the payment request can be transmitted to the determined person or entity associated with the proxy person or object. The transmission of the payment request can be sent in a manner similar to previously described in the prior figures, including FIGS. 2 and 3, among others.

Proxies can be used in various situations. In one example, where a representative or person associated with another person or entity is available for photos while the other person or entity is not, the proxy ability allows for easy requests. Proxy examples may include teachers where the actual entity associated with the payment request (e.g., a school fundraiser) is the school where the teacher works. Similarly, photos of children may be used to repay or request payment from the parents of those children. In some instances, third parties may connect the proxy persons to the actual persons or entities connected to the proxies. In those instances, the user using the proxy person in an image to generate a payment request does not need to have any knowledge of the contact information associated with the associated person or entity.

In addition to a photo or image that is taken contemporaneously with the bill, stock or older photos or images may be used in lieu of the current photo. For example, a family photo may be used to generate payment requests associated with children of a user, as well as to send funds to or request funds from family members. In other instances, a photo of a sports team on which a child may play can be used to reimburse team parents or other parents of children on the team, as well as to request reimbursement from the same. The children may be associated with their parents, allowing photos or images of the children to be linked to their parents, where the parent is responsible for payment from a picture of their child being used in the bill pay processes. In such instances, verification of the bill and the persons associated with the payment request may not be available. Verifications of the bill may be based on mutual agreement and may require a manual agreement to the requested payment before funds are transferred.

Stock photos, or photos of other persons or objects than those associated with the person to whom the payment-related requested is sent, may be used as a stand-in for known persons who may not wish or allow their pictures to be taken. For example, public figures may want to use a stock image instead of a real image. Alternatively, where persons are not in the same location at the time of a purchase, bill, or payment-related request, stock photos may be used. Additionally, stock photos or images may be used where no usable photo can be taken, such as in poor lighting conditions or where the purchase or bill is related to an event or action in poor weather, such as rain, snow, sleet, etc. In some instances, the stock photos may be used where individuals use image disruptors (e.g., infrared flashes used to prevent pictures from being taken), removing or reducing the ability to capture a usable photo.

In some instances, the bill pay system may include or be associated with a learning system and/or learning algorithm that remembers a person's selection based on types of purchases, including the location, merchant, frequency or timing, and/or type of purchase being made in the identified bill. Using these learning systems, users may be provided easier selections during the assignment operations.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:
   identifying a first image associated with a payment request, the identified first image including one or more identifiers of persons;
   identifying a second image associated with a bill, the bill including one or more line items, each line item associated with a cost;
   in response to identifying a request to initiate a bill payment split:
      performing an optical character recognition process on the bill, wherein the optical character recognition process identifies individual line items from the one or more line items and associates the individual line items with a corresponding cost associated with the individual line item; and
      presenting the bill, where at least a portion of the line items are selectable after the optical character recognition process is performed;
   receiving a selection of at least one line item;
   receiving a selection of a particular person from the one or more identifiers of persons to be associated with the at least one line items; and
   assigning the at least one selected line item to the selected particular person.

2. The method of claim 1, wherein the selection of the particular person is received after receiving the selection of the at least one line item.

3. The method of claim 1, further comprising analyzing the identified first image to identify at least one person from the one or more identifiers of persons as a potential recipient of the payment request.

4. The method of claim 3, wherein the one or more identifiers of persons included in the first image comprises images of one or more persons associated with the one or more identifiers of persons, and wherein analyzing the identified first image to identify at least one person includes performing a facial recognition process on the images of the one or more persons to identify the at least one person.

5. The method of claim 3, wherein two or more persons are identified as potential recipients of the payment request.

6. The method of claim 1, further comprising generating an overlay of the bill based on the optical character recognition process, wherein the overlay comprises selectable user interface objects associated with and presented as an overlay of the individual line items from the one or more line items, and wherein receiving the selection of the at least one line item comprises receiving a selection of user interface objects associated with and presented as overlays of the at least one selected item.

7. The method of claim 1, wherein assigning the at least one selected line item to the selected particular person includes associating the costs associated with each of the at least one selected line item to the selected particular person.

8. The method of claim 1, further in response to the request to initiate the bill payment split, presenting, adjacent to the bill, an interactive presentation of one or more persons included in the one or more identifiers of persons included in the first image.

9. The method of claim 8, wherein receiving the selection of the at least one line item from the bill includes receiving a touch-based input selection associated with the at least one line item.

10. The method of claim 9, wherein receiving the selection of the particular person includes receiving, subsequent to the touch-based input selection of the at least one line item, a drag touch-based input from the at least one selected line item to the particular person from the one or more persons.

11. The method of claim 10, further comprising automatically assigning at least one of gratuities and taxes based on a proportion of the at least one selected line items associated with the selection.

12. The method of claim 10, wherein the at least one selected line item from the bill is a first set of at least one line items, and wherein the selection of the particular person from the one or more identifiers of persons is a selection of a first particular person, the method further comprising:
   receiving a selection of a second set of at least one line item, the second set of at least one line item mutually exclusive from the first set of at least one line items;
   receiving a selection of a second particular person from the one or more identifiers of persons to be associated with the at least one line items; and
   assigning the second set of the at least one selected line items to the selected second particular person.

13. The method of claim 12, wherein the first particular person and the second particular person are the same.

14. The method of claim 1, further comprising transmitting a payment request to the selected particular person for the at least one assigned line item.

15. The method of claim 1, wherein at least one of the one or more identifiers of persons in the first image comprises an identifier of a proxy for a different person or entity, and wherein the at least one identifier of the proxy is used to identify the different person or entity without using an image of that different person or entity.

16. A non-transitory, computer-readable medium storing computer-readable instructions executable by a computer and configured to:
- identify a first image associated with a payment request, the identified first image including one or more identifiers of persons;
- identify a second image associated with a bill, the bill including one or more line items, each line item associated with a cost;
- in response to identifying a request to initiate a bill payment split:
  - perform an optical character recognition process on the bill, wherein the optical character recognition process identifies individual line items from the one or more line items and associates the individual line items with a corresponding cost associated with the individual line item; and
  - present the bill, where at least a portion of the line items are selectable after the optical character recognition process is performed;
- receive a selection of at least one line item;
- receive a selection of a particular person from the one or more identifiers of persons to be associated with the at least one line items; and
- assign the at least one selected line item to the selected particular person.

17. The medium of claim 16, further in response to the request to initiate the bill payment split, presenting, adjacent to the bill, an interactive presentation of one or more persons included in the one or more identifiers of persons included in the first image.

18. The medium of claim 17:
- wherein receiving the selection of the at least one line item from the bill includes receiving a touch-based input selection associated with the at least one line item, and
- wherein receiving the selection of the particular person includes receiving, subsequent to the touch-based input selection of the at least one line item, a drag touch-based input from the at least one selected line item to the particular person from the one or more persons.

19. A system comprising:
- a memory;
- at least one hardware processor interoperably coupled with the memory and configured to:
  - identify a first image associated with a payment request, the identified first image including one or more identifiers of persons;
  - identify a second image associated with a bill, the bill including one or more line items, each line item associated with a cost;
  - in response to identifying a request to initiate a bill payment split:
    - perform an optical character recognition process on the bill, wherein the optical character recognition process identifies individual line items from the one or more line items and associates the individual line items with a corresponding cost associated with the individual line item; and
    - present the bill, where at least a portion of the line items are selectable after the optical character recognition process is performed;
  - receive a selection of at least one line item;
  - receive a selection of a particular person from the one or more identifiers of persons to be associated with the at least one line items; and
  - assign the at least one selected line item to the selected particular person.

* * * * *